US012734951B1

(12) United States Patent
Dlacic et al.

(10) Patent No.: US 12,734,951 B1
(45) Date of Patent: Sep. 15, 2026

(54) SYSTEMS AND METHODS FOR DEPLOYING A RAMP ELEMENT

(71) Applicant: Zoox, Inc., Foster City, CA (US)

(72) Inventors: Roberto Dlacic, Foster City, CA (US); Mehdi Rezaeisaray, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/783,102

(22) Filed: Jul. 24, 2024

(51) Int. Cl.
*B60P 1/43* (2006.01)
*A61G 3/06* (2006.01)

(52) U.S. Cl.
CPC .............. *B60P 1/435* (2013.01); *A61G 3/061* (2013.01)

(58) Field of Classification Search
CPC ........ B60P 1/435; B60P 1/6454; A61G 3/061; A61G 3/067; A61G 3/0808; A61G 3/08; B60J 5/0497; B60G 2300/30; Y10S 414/134
See application file for complete search history.

(56) References Cited

U.S. PATENT DOCUMENTS 6,095,747 A 8/2000 Cohn
6,764,123 B1 7/2004 Bilyard
7,001,132 B2 2/2006 Koretsky et al.
8,250,693 B1 8/2012 Johnson et al.
11,842,304 B2 12/2023 Keen et al.
2006/0233632 A1 10/2006 Hayes et al.
2006/0245883 A1 11/2006 Fontaine et al.
2014/0245548 A1* 9/2014 Johnson ................. A61G 3/061 14/71.3
2018/0311085 A1 11/2018 Lacaze et al.
2021/0155264 A1* 5/2021 MacPherson .......... A61G 3/065
2021/0370976 A1 12/2021 Uelmen et al.
2022/0153354 A1* 5/2022 Slabaugh ........... B62D 33/0273
2022/0305977 A1* 9/2022 Oya ......................... E05F 15/73
2024/0262275 A1* 8/2024 Cabanus .................. B60J 5/108
2024/0367572 A1* 11/2024 Kemmet ................. B60P 1/433
2025/0017791 A1* 1/2025 Lee ......................... A61G 3/061
2025/0018848 A1* 1/2025 McKnew ................ B60P 1/431

FOREIGN PATENT DOCUMENTS

WO 2013086559 A1 6/2013

OTHER PUBLICATIONS

U.S. Appl. No. 17/490,962, filed Sep. 30, 2021, titled “Passenger Assist Entry-Exit Assembly and Vehicle With Same”.
United States non-final Office Action dated Jul. 1, 2026 for U.S. Appl. No. 18/783,171.

* cited by examiner

*Primary Examiner* — Esvinder Singh
(74) *Attorney, Agent, or Firm* — EIP US LLP

(57) ABSTRACT

The disclosure describes systems, as well as methods and computer-readable media for deploying a ramp element of a vehicle. A first actuator assembly is provided to releasably couple the ramp element to a first portion of the vehicle and a second actuator assembly is provided to rotate the ramp element around a first axis, arranged at a proximal portion of the ramp element, to move the ramp element from a stowed position to a deployed position.

20 Claims, 14 Drawing Sheets

600
Vehicle 602
Vehicle Computing
Device 604
Processor(s) 614
Memory 616
Perception 618
Localization 620
Planning 622
Maps 624
Driving log data
626
Prediction 628
System Controller(s)
630
Sensor(s) 606
• Impact sensors
• Location
• Inertial (e.g. IMU)
• LIDAR
• Radar
• Sonar
• Infrared
• Image
• Audio
• Environmental
• Temperature
Emitters(s) 608
Network interface
610
Drive system(s) 612
Network(s)
638
Computing device(s) 632
Processor(s) 634
Memory 636
902

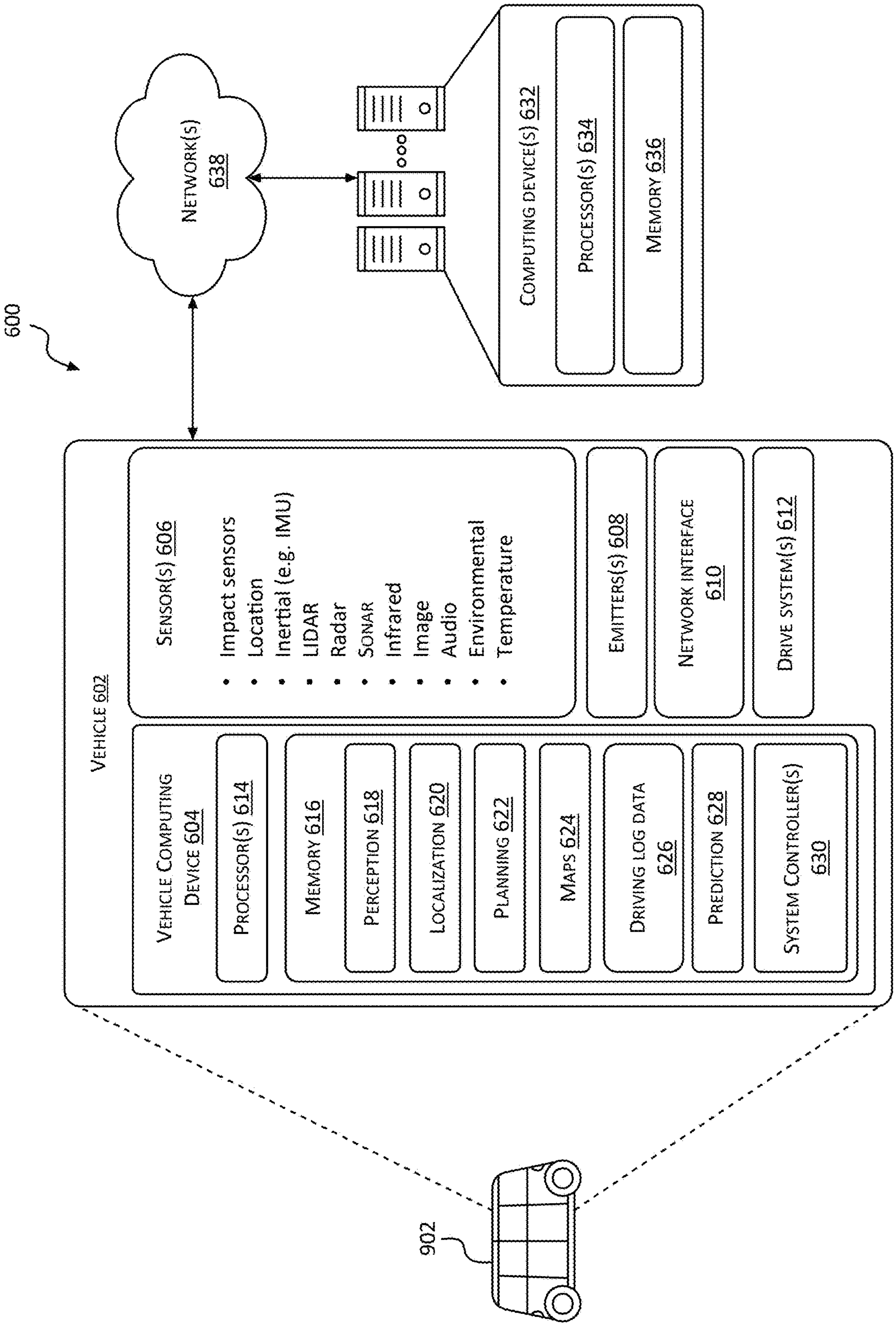

FIG. 6

SYSTEMS AND METHODS FOR DEPLOYING A RAMP ELEMENT

BACKGROUND

Inclusiveness and accessibility are important principles in vehicle design, particularly in the context of vehicle sharing and ride-hailing services. Ensuring that all individuals, regardless of their physical abilities, can easily access and utilize transportation services is a guiding principle in product development. Various measures have been proposed to achieve these goals, including user-friendly interfaces for individuals with visual or hearing impairments and features that facilitate easy ingress and egress. An example of the latter is the ramp, which may provide accessibility for passengers using wheelchairs. However, traditional ramps can be cumbersome, space-consuming, and challenging to operate.

BRIEF DESCRIPTION OF DRAWINGS

The detailed description is described with reference to the accompanying figures. The use of the same reference numbers in different figures indicates similar or identical components or features.

FIG. 6 depicts a block diagram of an example vehicle system.

DETAILED DESCRIPTION

Figure 1A:
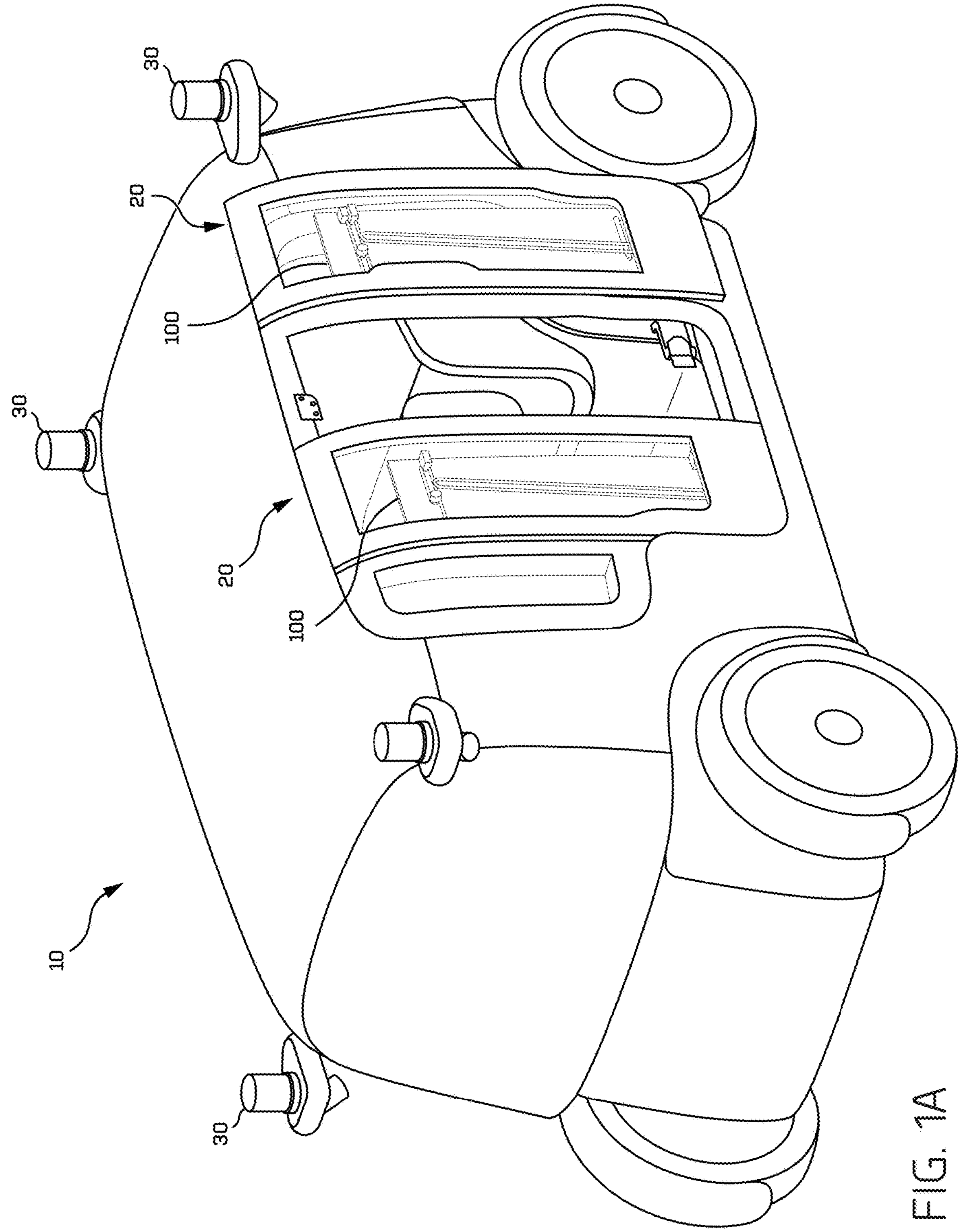
FIG. 1A shows a vehicle with a ramp element in a stowed position, in which it is coupled to a door of the vehicle.

This disclosure describes techniques including procedures, as well as methods, systems, and computer-readable media for deploying a ramp element supporting, for example, a wheelchair entering or exiting a vehicle. The ramp element is typically operated by a first actuator assembly that decouples the ramp element from a portion of the vehicle and a second actuator assembly that rotates a proximal portion of the ramp element around a rotation axis to move the ramp element from a stowed position to a deployed position, in which a distal portion of the ramp element rests on the ground.

The ramp element may be formed as one or more separate components that are releasably coupled to a first portion of the vehicle, such as the vehicle door. When not needed, the ramp element may remain attached to the door and move with the door as it opens and closes. When needed, the ramp element may be decoupled from the door and deployed to facilitate ingress and egress for passenger using a wheelchair.

Alternatively, the ramp element may be integrated into the door itself, with the door serving a dual purpose by transforming into a ramp element. When required, the door can be decoupled from a first portion of the vehicle and rotated around a rotation axis, allowing the distal portion of the door to rest on the ground and form a ramp.

Generally, the first actuator assembly is operable to couple the ramp element to the vehicle when the ramp element is not needed, i.e., when the ramp element is in the stowed position, and to decouple the ramp element from the vehicle to allow the ramp element to be deployed. The second actuator is operable to enable or facilitate the rotation of the ramp element around a rotation axis, allowing the ramp element to pivot into a deployed position where the distal portion of the ramp element rests on the ground and the proximal portion of the ramp element remains coupled to the vehicle, facilitating ingress and egress for a wheelchair.

The second actuator assembly may serve a dual purpose, depending on whether the ramp element is a separate component attached to the door or formed by the door itself. If the ramp element is a separate component, the second actuator assembly may decouple the ramp element from the vehicle body in the stowed position to allow the ramp element to move together with the door as it opens and closes. When the ramp element is needed for ingress and egress, the second actuator assembly may couple the ramp element to the vehicle body and rotate the ramp element into the deployed position after the doors have been actuated to a state to provide space for deployment. If the ramp element is formed by the door itself, the second actuator assembly may couple the door to the vehicle body both in the stowed and deployed positions. In the stowed position, the door may function as a regular door, and in the deployed position, it may serve as a ramp. The second actuator assembly may comprise a double-axis hinge element, allowing the door to rotate around one axis for use as a ramp and around a second axis for standard door operation.

The ramp element may be operated based on a ramp request, indicating a request to deploy the ramp element. More specifically, the first and second actuators maybe operated based on the ramp request, such that the ramp element is decoupled from the first portion of the vehicle and pivoted from the stowed position into the deployed position. The ramp request may be received directly from a user via a user interface at the vehicle or of a mobile device application, or from data retrieved by a transportation system indicating user preferences. For example, the user can indicate their need for a ramp element when ordering the ride through the mobile device application, or by pressing a button located inside or outside the vehicle.

The ramp request may be associated with a ramp deployment location, such as a pick-up or drop-off point where the passenger will need the ramp element. This may also be referred to as a destination location, indicating a pick-up location or a drop-off location. The current location of the vehicle may be compared with the ramp deployment location, and the ramp element deployed when the vehicle reaches the specified location.

Before initiating the deployment of the ramp element, a condition of the environment of the vehicle may be assessed. Specifically, data from a sensor, such as an image sensor can be used to verify that the movement path of the ramp element, as it is moving between the stowed and deployed position, is free of obstacles and that it is safe of deploy the ramp element. In some examples, the condition of the environment may indicate proximity of a user, associated with a rolling device, or wheeled device, to the vehicle or to their destination. This may allow the ramp element to be deployed when the user is in the proximity of the vehicle, and/or when the vehicle, carrying the user, is in the proximity of the user's destination. Additionally, or alternatively, a determination may be made as to whether the current pick-up or drop-off location is associated with the user requiring the ramp such as by, for example, receiving a request from the user via their mobile device or an interface within the vehicle, based on a user profile associated with the user, computer vision techniques capable of recognizing the need for a ramp (e.g., a wheelchair, stroller, etc. is detected proximate the user upon calling the vehicle), etc.

In some examples, sensor data may be used to verify that there is enough space in a pick-up or drop-off zone to deploy the ramp. If the space is insufficient, or if there is an obstacle preventing safe deployment, the vehicle may move to another location before the ramp element is deployed.

A visual indicator may be generated to alert others proximate the vehicle that the ramp element is in, or will be in, operation, moving between the stowed position and the deployed position. The visual indicator may hence serve to warn pedestrians and other nearby individuals that the ramp element is in motion. In further examples, an audio alert can be generated, serving a similar purpose. The visual indicator or audio alert may be activated together with the actuator assemblies and may remain active throughout the entire operation cycle. Deploying the ramp element may be delayed until a sufficient space is provided proximate the vehicle to open the ramp. Once the ramp element is fully deployed or stowed, the indicator or alert may turn off, signaling that the ramp element is no longer in motion.

The visual indicator may be implemented as a bright, flashing LED light positioned on the exterior of the vehicle, or as a digital display showing messages such as 'Ramp deploying' or 'Ramp retracting' to provide clear warnings.

In some examples, a barrier element or access control arm may be used to block access to the ramp element when it is in motion, improving safety and information users when it is safe to enter the ramp element. The barrier element, which may be controlled by an actuator mechanism, may be synchronized with the ramp element's movement, may extend across the entry point of the ramp element to prevent access during deployment and retraction. Indicator lights may be integrated into the barrier element to provide visual signals, e.g. showing red when the ramp element is moving and green when it is safe to enter.

In some examples, sensor data may be retrieved, indicating a position of the ramp element. The sensor data may, for example, be retrieved from a proximity sensor monitoring a distance between the distal portion of the ramp element and the ground, or a rotational sensor monitoring an angular position of the ramp element in relation to the first axis. The sensor data may be processed to determine that the ramp element is fully deployed and ready to be used for ingress and egress. The sensor data may further be processed to determine that the ramp element is fully deployed and that the vehicle is ready to move.

The ramp may form a surface or pathway which can be arranged to connect two different points, typically two different levels, providing a means of access between them. When used to support a wheelchair, the ramp may be referred to as a wheelchair ramp. The ramp may be formed by one or more ramp elements, such as two parallel rails or tracks onto which the wheels of a wheeled device such as a wheelchair, a stroller, a cart, or the like can be aligned. In other examples, the ramp is formed by a single ramp element, known as a platform ramp, onto which the wheeled device may travel during ingress and egress. The ramp disclosed herein is not necessarily limited to facilitating the ingress and egress of wheelchairs. It may also be configured to accommodate other types of equipment, such as strollers, rollators, and various mobility aids.

The terms 'proximal' and 'distal' are used to describe the relative positions of different parts of the ramp element in relation to the vehicle. Proximal typically refers to the part or portion of the ramp element that is closest to the main structure of the vehicle when deployed. This may be understood as the end of the ramp element that remains attached or coupled to the vehicle when the ramp is deployed. The proximal end may serve as the anchor point, providing stability and support as the ramp moves to facilitate ingress and egress. Distal, here, refers to the part of the ramp element that is farthest from the main structure of the vehicle. This may be understood as the end of the ramp element that contacts the ground when the ramp is deployed, creating an inclined surface or path for wheelchair access.

The first actuator, or first actuator assembly (such as when one or more actuators are connected to various other components to achieve the desired motion) may operate to couple the ramp element to the vehicle when the ramp element is in its stowed position and to decouple the ramp element when deployment is required. The second actuator, or second actuator assembly, may enable the rotation of the ramp element around a rotation axis, or pivot ais, allowing it to transition from the stowed position to the deployed position. For instance, if the ramp element is attached to the vehicle door, the first actuator assembly may manage a latching and unlatching mechanism that holds the ramp element in place, while the second actuator assembly may control the door's pivoting action to form a ramp. Upon receiving a ramp request, the actuator assemblies may deploy the ramp element, making it accessible for wheelchair users.

The terms 'stowed' and 'deployed' are used to describe the position of the ramp element in relation to its intended use. 'Stowed' refers to the position or state where the ramp is stored away or retracted when not in use. In this state, the ramp typically stays attached to the door or forms the door and provides a standard door operation. The term 'deployed' refers to the position or state where the ramp is extended and ready for use. In this state, the ramp is positioned to provide a pathway for wheelchair users, connecting the ground and the vehicle floor.

The techniques described herein can be implemented in a number of ways to support a wheelchair entering or exiting a vehicle. Examples are provided below with reference to the appended figures. Examples are discussed in the context of autonomous vehicles; however, the methods, systems, and non-transitory computer-readable media described herein can be applied to a variety of vehicles and are not limited to autonomous vehicles. In one example, the techniques described herein may be utilized in driver-controlled vehicles.

Figure 1B:
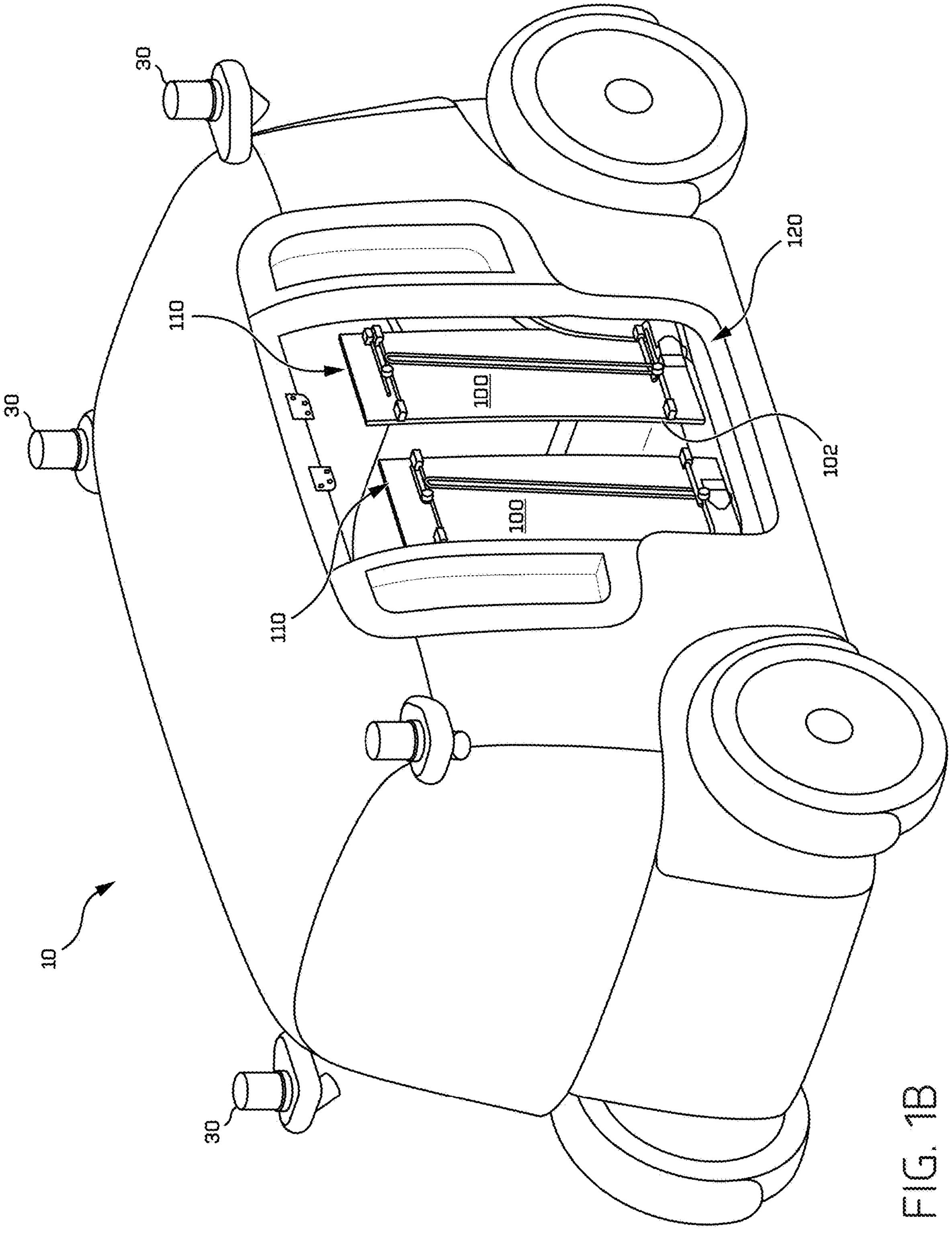
FIG. 1B shows the vehicle with the ramp element decoupled from the door. The door has been omitted for clarity.
Figure 1C:
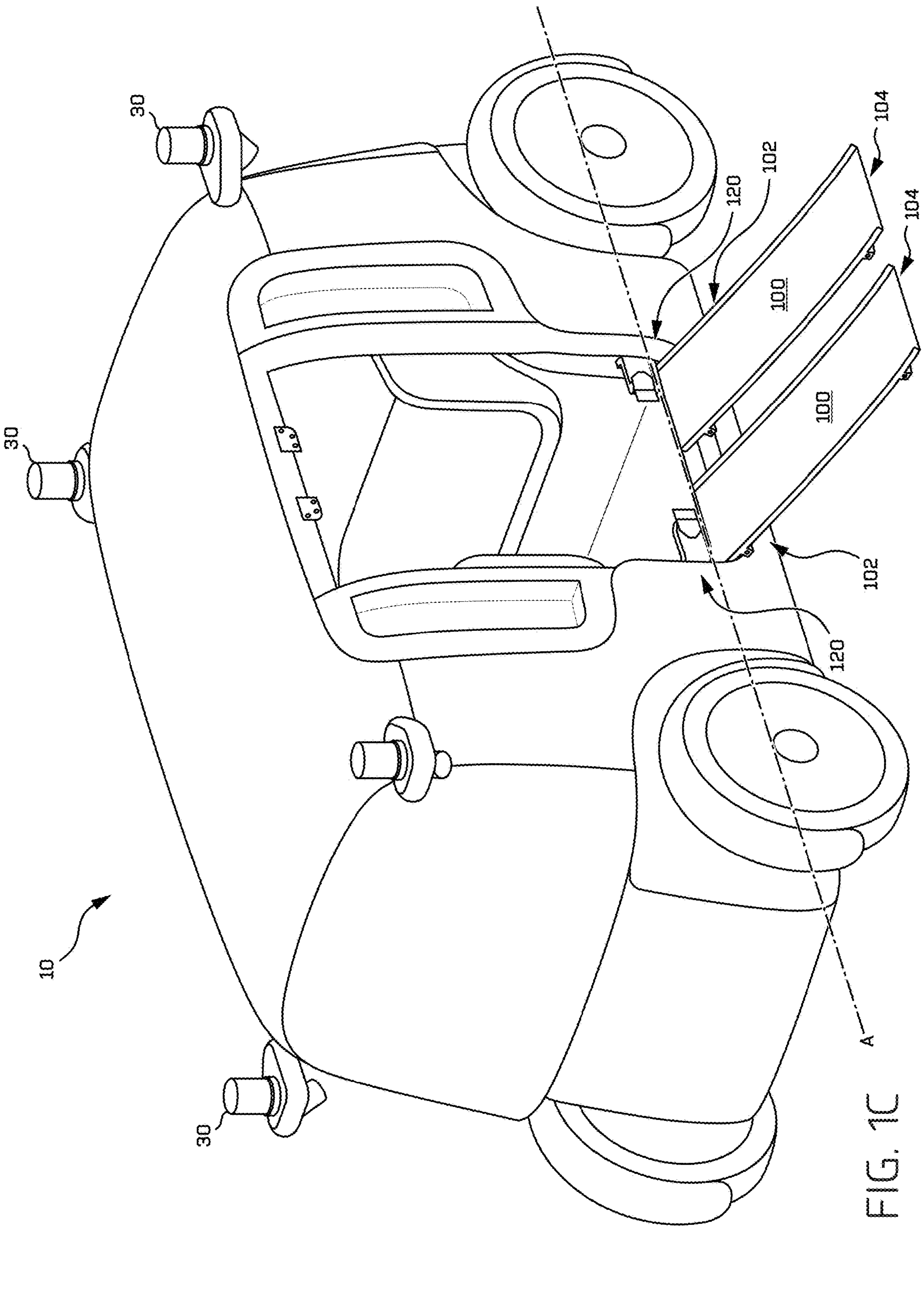
FIG. 1C shows the vehicle with the ramp element arranged in a deployed position, forming part of a ramp.

FIGS. 1A, 1B, and 1C illustrate a perspective view of an example vehicle 10, which may be a driverless vehicle or a driver-controlled vehicle. The driverless vehicle 10 may be capable of performing all safety-critical functions for an entire trip, with the passenger no being expected to control the vehicle at any time. In such examples, because the vehicle 10 can be configured to control all function from start to completion of the trip, including all parking functions, the vehicle 10 may not include a driver and/or controls for manual driving, such as a steering wheel, an acceleration pedal, and/or a brake pedal. This is merely an example, and the systems and methods described herein may be incorporated into any vehicle, including those ranging from vehicles that need to be manually controlled by a driver at all ties, to those that are partially or fully autonomously controlled.

The vehicle 10 may be any configuration of vehicle, such as, for example, a van, a sport utility vehicle, a cross-over vehicle, a truck, a bus, and a construction vehicle. The vehicle 10 may be powered by one or more internal combustion engines, one or more electric motors, hydrogen power, and any combination thereof, and/or any other suitable power sources. Although the vehicle 10 comprises four wheels, the systems, methods and non-transitory computer-readable media described herein may be incorporated into vehicles having fewer or greater number of wheels, tires, and/or tracks. The example vehicle 10 can have four-wheel steering and can operate generally with equal performance characteristics in all directions. For instance, the vehicle 10 may be configured such that a first end of the vehicle 10 is the front end of the vehicle 10, and an opposite, second end of the vehicle 10 is the rear end when traveling in first direction, and such that the first end of the vehicle 10 becomes the rear end of the vehicle 10 and the second end of the vehicle becomes the front end of the vehicle 10 when traveling in the opposite direction. Stated differently, the vehicle 10 may be a bi-directional vehicle capable of traveling forward in either of opposite directions. These example characteristics may facilitate greater maneuverability, for example, in small spaces or crowded environments, such as parking lots and/or urban areas.

The example vehicle 10 can include one or more doors, such as a pair of doors 20 on at least one side of the vehicle. The door 20 can be made of up any number of sections, panels, or portions that are moveable to create an opening for a passenger to enter and exit the vehicle 10. In some examples, the vehicle 10 may be configured with a door on each side of the vehicle 10. A user interface, or door interface, can be included in each door, or in a panel of the vehicle 10 adjacent each door 20, to provide the interaction techniques described herein.

In some examples, the door interface can be operable to receive an input and output various instructions to control the vehicle 10, and more specifically the door 20 and/or the ramp element 100. This may, for example, be achieved by the door interface sending an instruction to a vehicle computing device. Further, the door interface may communicate with the user, and/or communicate with a computing device remote from the vehicle 10. In some examples, the door interface can be coupled to the door 20 of the vehicle 10, or the ramp element 100. The door interface can represent a button, such as a mechanical button. As above, in additional or alternative examples, such control may be based on various other signals.

The door 20 may be movably connected to a frame, body, or other component of the vehicle 10 via one or more door actuators. For example, a first door actuator may connect a first portion of the vehicle door 20 to the vehicle 10, and a second door actuator may connect a second portion of the door 20 to the vehicle 10. In such examples, the door actuators may include various components configured to transition the door 20 between an open position providing access to the interior space of the vehicle 10, and a closed position blocking access to the interior space. Additionally, when transitioning the door 20 between the open and closed positions, the door actuators may be configured to move the door 20 along a travel path such that a face and/or outer surface of the door 20 remains substantially parallel to a longitudinal axis of the vehicle 10 along the travel path. For example, in transitioning the door 20 between the open position and the closed position, the door actuators may move the door 20 along a path substantially parallel to the longitudinal axis of the vehicle 10 when moving the door 20 in the forward direction or in the rearward direction. FIG. 1A shows an example of such configuration, in which a first door 20 of the example vehicle 10 is arranged in a closed position and a second door 20 of the vehicle 10 is arranged in the open position, in which it has been moved substantially parallel to the side of the vehicle 10. Transitioning the door 20 between the open position and the closed position may also include movement of the door 20 in a direction substantially perpendicular to the longitudinal axis (e.g., inward toward the interior space when closing the door 20 and outward away from the interior space when initially opening the door 20) for a portion of the door travel path.

In the 'closed' position, the vehicle door 20 may be disposed adjacent to and/or in contact with a frame, body, and/or other portions of the vehicle 10 such that the door 20 (or two or more vehicle doors 20 in combination) substantially enclose the interior space and/or substantially block access to the interior space from a location outside of the vehicle 10. Likewise, in the 'open' position, the door 20 may be disposed ajar relative to the frame, body, and/or other portions of the vehicle 10 such that the door 20 (or the vehicle doors 20 in combination) permits access to the interior space from a location outside of the vehicle 10. FIG. 1A illustrates a pair of doors 20, in which one door is arranged in the closed position and another door 20 is arranged in the open position.

The example vehicle 20 shown in FIGS. 1A, 1B, and 1C comprises a ramp element 100 for supporting a mobility aid, such as a wheelchair, entering or exiting the vehicle 10. Please note that the doors have been omitted in FIGS. 1B and C for clarity. Various configurations and designs of the ramp element 100 are possible. Typically, the ramp element 100 is a component that provides a ramp functionality, either as part of a larger structure forming a ramp or as the entire ramp itself. The ramp may comprise a surface or pathway which can be arranged to connect two different points at different levels, such as the ground and a floor of the vehicle 10, providing a means of access between them. In the present example, the ramp is formed by a pair of ramp elements 100 onto which a wheeled device, such as a wheelchair, may travel during ingress and egress. The ramp formed by the pair of elements 100 may also be referred to as a rack ramp, or rail ramp, providing two substantially parallel rails or tracks onto which the wheels to the wheelchair can be aligned. Other configurations are however possible, including a ramp formed by a single supporting surface, also known as a platform ramp. For brevity, the configuration and function of a single ramp element 100 are discussed below. It should be noted, however, that the features and functions of the single ramp element 100 can be applied to two or more ramp elements providing the ramp functionality.

The ramp element 100 may be formed of a material that provides the structural rigidity and strength necessary to support the weight of a user and their associated wheeled device, such as a wheelchair. In some examples, the ramp may be designed to support the weight of a $95^{th}$ percentile user and their wheeled device. Examples of such materials include, but are not limited to, aluminum (such as honeycomb aluminum panels) and composite materials. In further examples, the ramp element 100 may comprise a translucent or transparent material, allowing light to pass into the interior of the vehicle 10. In some examples, the ramp element 100 may be formed fully or partially of polymeric sheets, such as transparent polymeric sheets, or hardened glass, to provide a see-through functionality.

The ramp element 100 depicted in FIGS. 1A, 1B, and 1C is a separate component that is releasably coupled to a first portion of the vehicle, such as the vehicle door. When not needed, the ramp element may remain attached to the door and move with the door as it opens and closes. When needed, the ramp element may be decoupled from the door and deployed to facilitate ingress and egress for passengers.

The ramp element 100 may be arranged in different states, or positions, depending on whether it is needed to not. These positions may be referred to as 'stowed' and 'deployed', where stowed refers to the ramp elements 100 being stored away or retracted when not in use and deployed refers to the ramp elements 100 being extended and ready for use.

FIG. 1A shows the example ramp element 100 in the stowed position, in which it is attached to an inside of a door 20 of the vehicle 10. In this position, the ramp element 100 may remain attached to the door 20 when the door 20 is operated, i.e., when the door 20 transition between the closed state and the open state as shown in FIG. 1A. Thus, when the door 20 opens by swinging outward or sliding forward/backward, the ramp element 100 attached to the door 20 moves with the door 20 to permit access to the interior space from a location outside of the vehicle 10.

When the ramp is needed, the ramp element 100 may be decoupled from the door 20 to enable deployment. Once the ramp element 100 have been decoupled, the door 20 may be arranged in the open state to allow the ramp to be positioned, providing a pathway between the ground and the vehicle floor. FIG. 1B shows the pair of ramp elements 100 after they have been decoupled from the respective doors 20 (omitted in FIG. 1B) but before they have been deployed.

Each ramp element 100 may be operated by one or more actuator assemblies for releasably coupling the ramp element 100 to the vehicle 10 and for rotating the ramp element 100 to move it between the stowed position and the deployed position. FIG. 1B shows an example wherein each ramp element 100 comprises a first actuator assembly 110 configured to releasably couple the ramp element 100 to the respective door 20 and a second actuator assembly 120 configured to releasably couple a proximal portion 102 of the ramp element 100 to the body of the vehicle 10 and rotate the ramp element 100 around a rotation axis during deployment and retraction of the ramp element 100. The first actuator assembly 110 may be attached to the respective door 20 to reduce the weight of the ramp elements 100. A detailed example of the first and second actuator assemblies 110, 120 are discussed in connection with FIGS. 3A-3D.

FIG. 1C shows the ramp element 100 in the deployed position, in which a distal portion 104 of the ramp element 100 rests on the ground to provide a pathway between the ground and the interior of the vehicle 10. Please note that the doors 20 have been omitted for clarity. The ramp element 100 have been moved from the stowed position in FIG. 1A into the deployed position in FIG. 1C by means of the second actuator assembly 120. The second actuator assembly 120 may provide a rotatable coupling between the proximal portion 102 of the ramp element 100 and the body of the vehicle 10, in this example the floor, where there the ramp element 100 may be designed to provide a smooth transition between the ramp and the floor when arranged in the deployed position. The second actuator assembly 120 may be operated to pivot the ramp element 100 around a first axis, or pivot axis A, extending along a longitudinal axis of the vehicle 10, to lower the distal portion 104 of the ramp element 100 toward the ground.

As previously mentioned, the example ramp elements 100 form a rail ramp. However, other types of ramps are also possible, such as platform ramps formed by a single ramp element that can be deployed from a stowed position. It will be appreciated that different types of ramps may have a similar design in terms of gradient, width, and surface requirements. The depicted example ramp elements 100 are provided with a non-slip surface and edges to keep the wheelchairs safely on the ramp. Furthermore, the total width of the ramp may in some examples be between 0.9 and 1.2 meters.

In some examples, the ramp may be designed to achieve a typical slope ratio of approximately 1:12 when fully extended. This indicates that for every 12 units of horizontal span, there is a corresponding 1 unit of vertical elevation.

Figure 2:
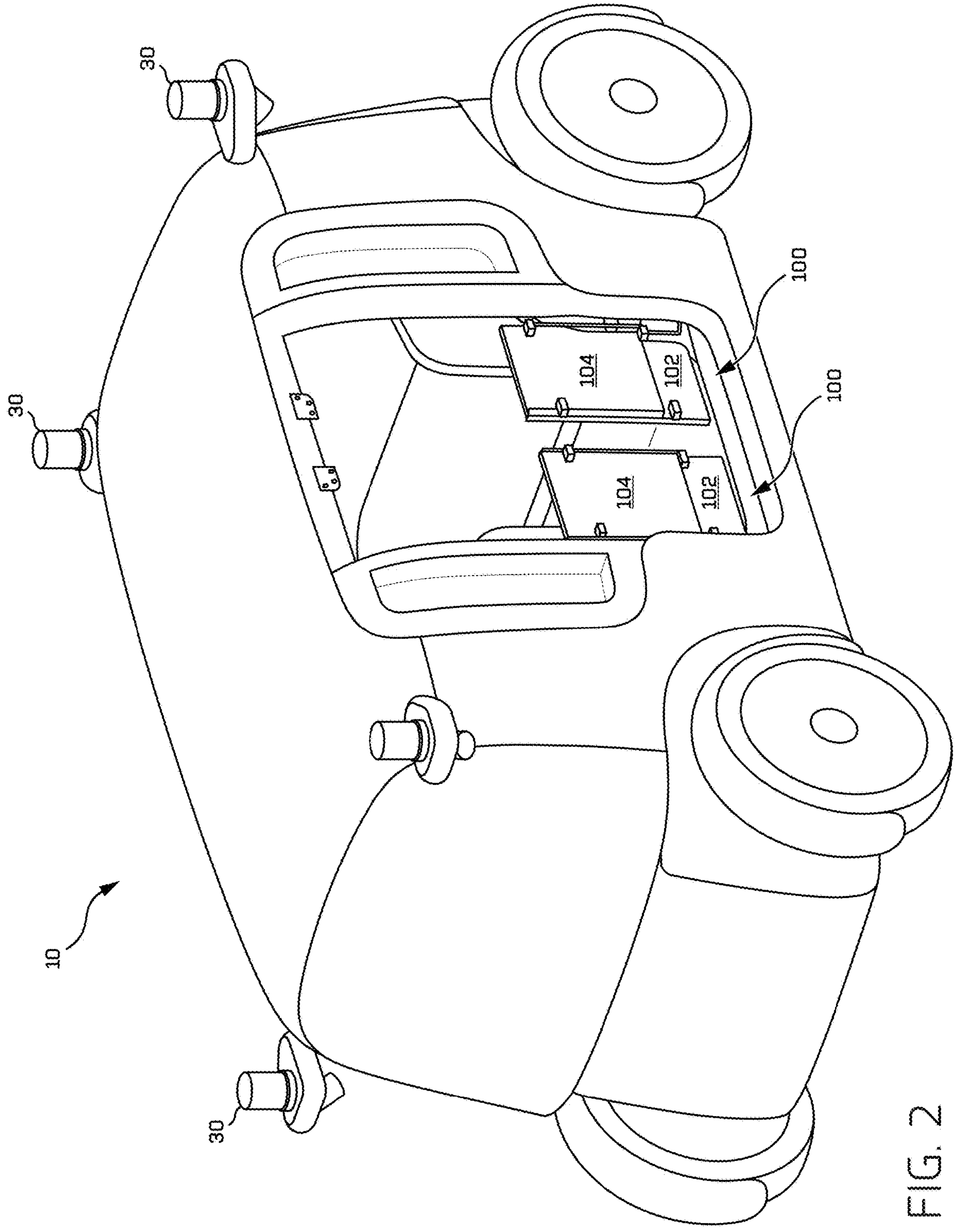
FIG. 2 shows a vehicle comprising a foldable ramp element.

The ramp element 100 may be configured to be foldable, which allows for a compact configuration when not in use. An illustration of this configuration is depicted in FIG. 2, where the distal portion 104 of the ramp element 100 is articulated to fold toward the proximal portion 102. This folding mechanism may diminish the overall length of the ramp element 100 when it is in the stowed state, thereby facilitating unobstructed visibility through at least a portion of the door 20. Please note that the doors are omitted in FIG. 2 for clarity.

The folding mechanism may comprise a combination of hinges and support structures that allow the ramp element 100 to be compacted for storage and expanded for use. The ramp element 100 may be divided into two or more sections, such as the proximal portion 102 and the distal portion 104, which may be connected by one or more hinges. The hinges allow the distal portion 104 to fold onto the proximal portion 102, reducing the ramp element's 100 length when stowed. When deployed, support structures may lock into place to ensure the ramp elements 100 are stable and can bear the weight of a wheelchair and its user. The support structures may include legs or braces that swing out or slide into position.

To deploy the ramp, the first actuator assembly 110 may decouple the stowed ramp element 100 from its secured position. As the ramp element 100 is tilted downwards, gravity may pull the distal portion 104, causing it to unfold toward the ground. The hinges may ensure that the portions 102, 104 unfold in a controlled manner, with the distal portion 104 swinging down until it reaches the ground, forming a substantially continuous slope with the proximal portion 102. To stow the ramp after use, the proximal portion 102 may be lifted and the distal portion 104 folded back onto the proximal portion 102 by the influence of gravity. Once stowed again, the first actuator assembly 110 may be operated to couple the ramp elements 100 to the vehicle doors 20.

In further examples, an actuating mechanism, such as a belt assembly, may be employed to unfold and fold the distal portion 104 during deployment and retraction.

The ramp element 100 may be releasably coupled to the door 20 in various ways, providing flexibility and adaptability in design. The coupling mechanisms may, for example, include one or more pins, bolts, or rods for attaching and releasing the ramp element 100 from the door, electromagnets forming a magnetic coupling between the ramp element 100 and the door 20, mechanical latches, hooks and loops, and clamps.

FIGS. 3A-D show an example of a ramp element 100, a first actuator assembly 110, and a second actuator assembly 120. The door 20 has been omitted for clarity. The first actuator assembly 110 is operable to attach and detach the ramp element 100 from a first portion of the vehicle 10, such as the door 20. The depicted first actuator assembly 110 may be attached to the door 20 and comprises a linear actuator 112 operating set of pins 114, 114' that engage with or disengage from corresponding attachment points 116, 116' on the ramp element 100. The linear actuator 112 may be an electric actuator powered by means of an electric cable. The power supply, and hence the operation of the actuator 112, may be controlled by a drive component controller as indicated in FIG. 6. The pins 114, 114' may be understood as elongated means, which may have a circular or quadrangular cross section, which can be moved linearly to form a coupling between the door 20 and the ramp element 100.

Figure 3A:
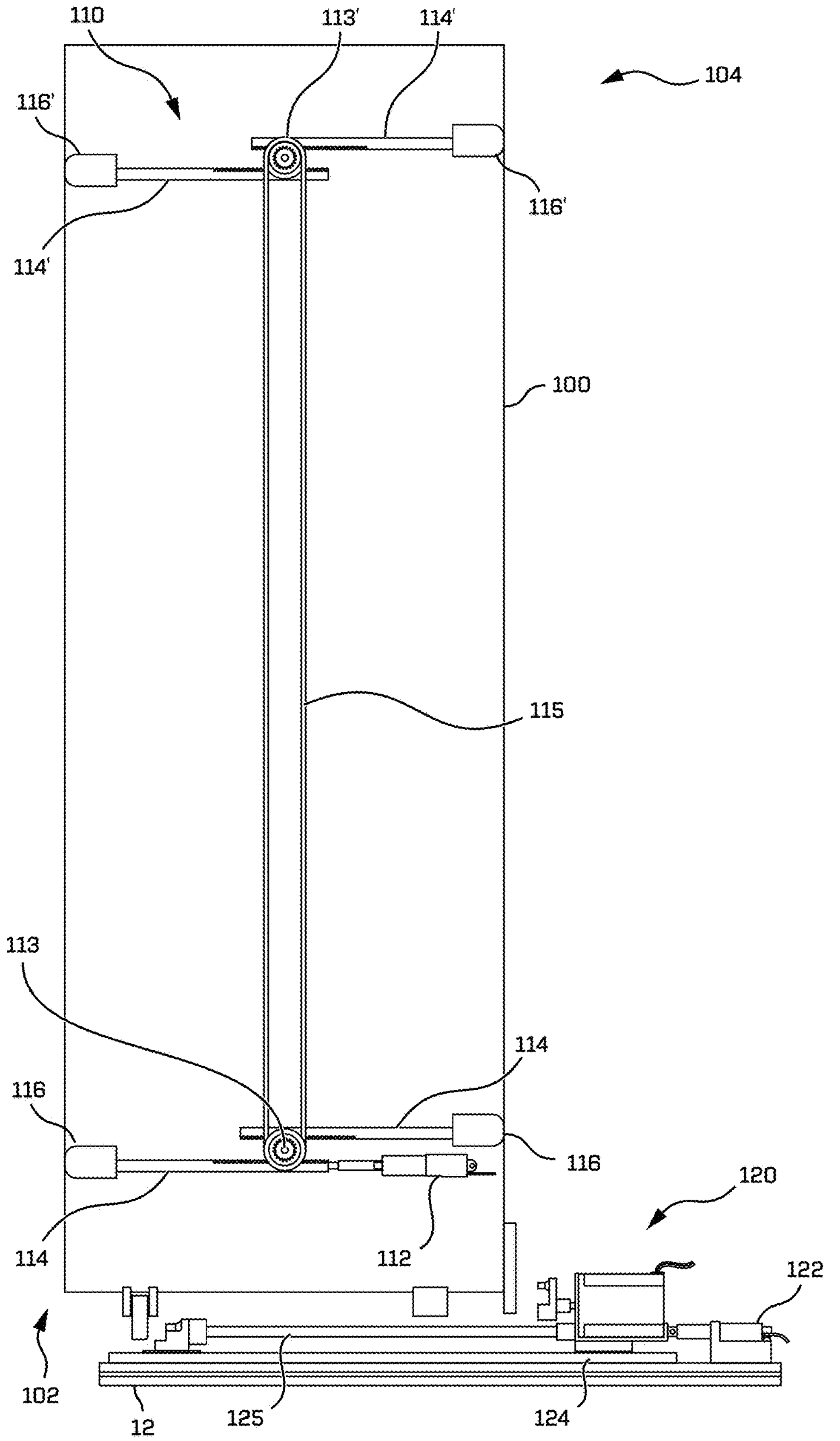
FIGS. 3A and 3B show a first actuator assembly coupling a ramp element to a first portion of a vehicle and a second actuator assembly arranged at a second portion of the vehicle and decoupled from the ramp element.
Figure 3B:
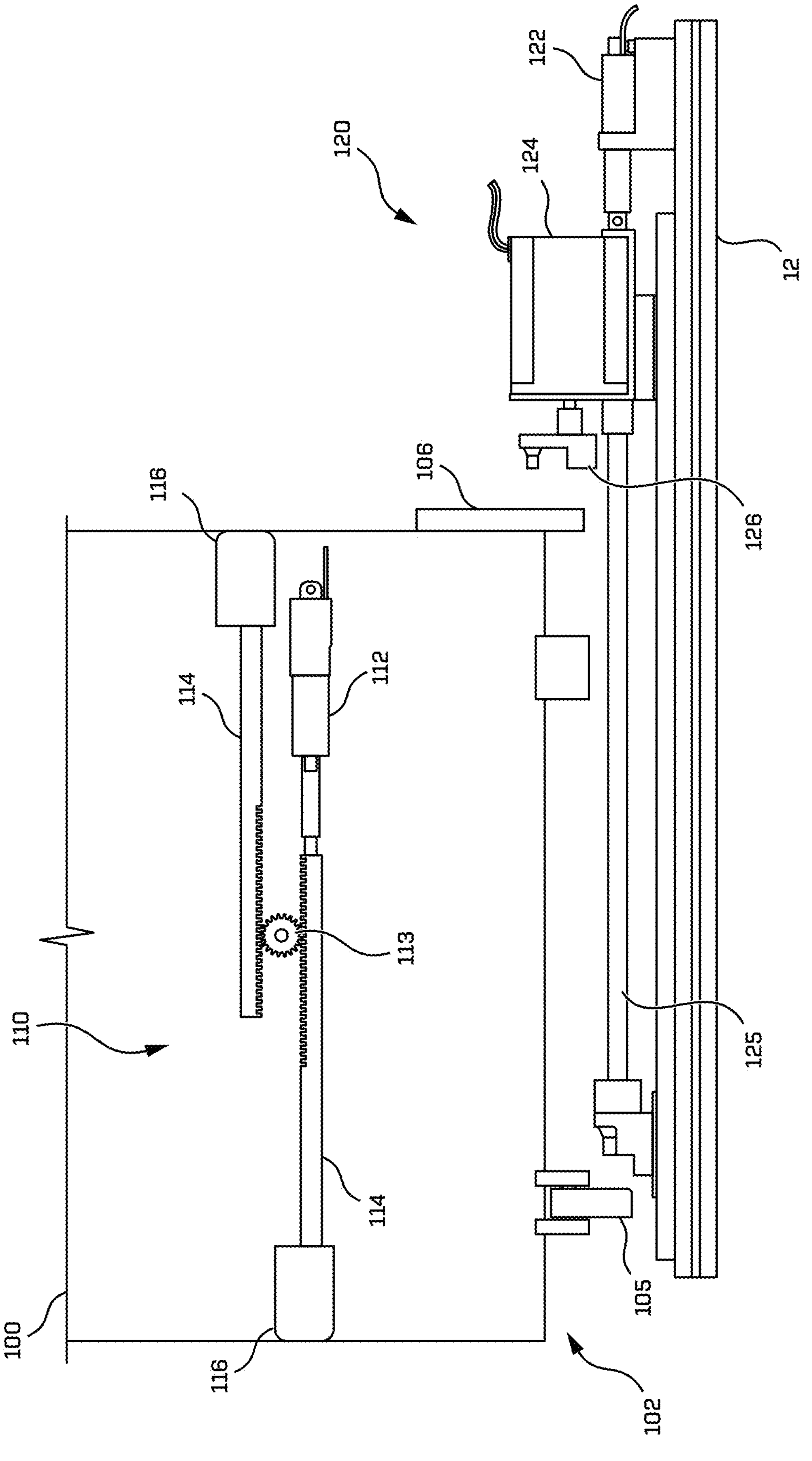

FIGS. 3A-D also disclose an example of a second actuator assembly 120 operable to releasably couple a proximal portion 102 of the ramp element 100 to the vehicle 10 and tilting the ramp element 100 when the ramp is needed. FIGS. 3A and 3B show the example ramp element 100 in a stowed position, in which the first actuator assembly 110 is engaging the attachment points 116, 116' of the ramp element 100. The second actuator assembly 120, which in this configuration is attached to the body of the vehicle 10, is decoupled from the ramp element 100. This allows the ramp element 100 to remain attached to the door 20 when the door 20 opens and closes.

Figure 3C:
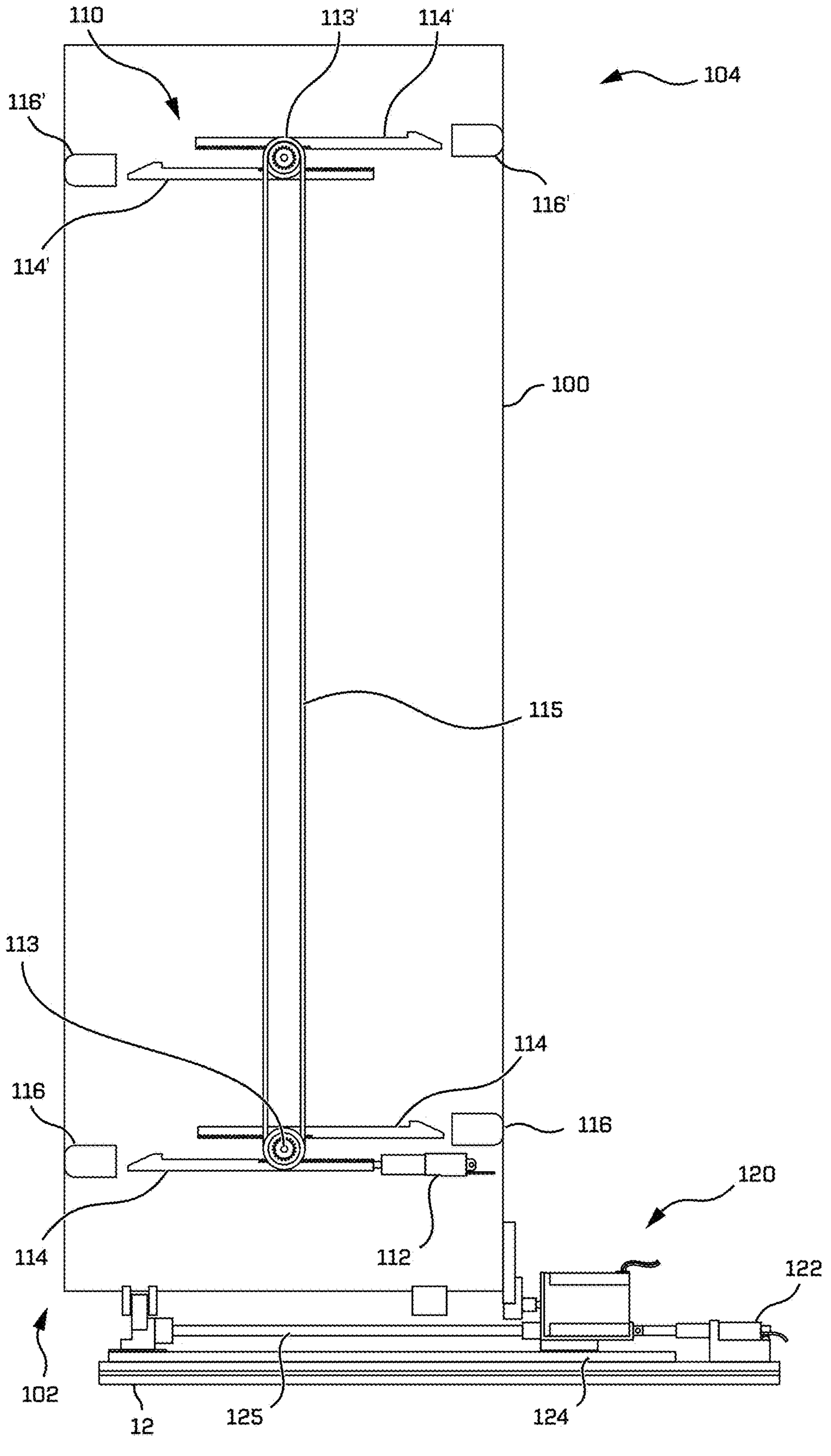
FIGS. 3C and 3D show the first actuator assembly decoupled from the first portion of the vehicle and the second actuator assembly coupling the ramp element to the second portion of the vehicle.

FIGS. 3C and D show the ramp element 100 when decoupled from the door 20, i.e., after the first actuator assembly has been engaged to release the attachment points 116, 116' of the ramp element 100 to allow the ramp element 100 to maintain its position as the door 20 transitions from a closed to an open state. In this state, the second actuator assembly 120 has been engaged to couple a proximal portion 102 of the ramp element 100 to the body of the vehicle 10. The coupling is rotatable to allow the ramp element 100 to pivot downwards to assume the deployed state.

Figure 3D:
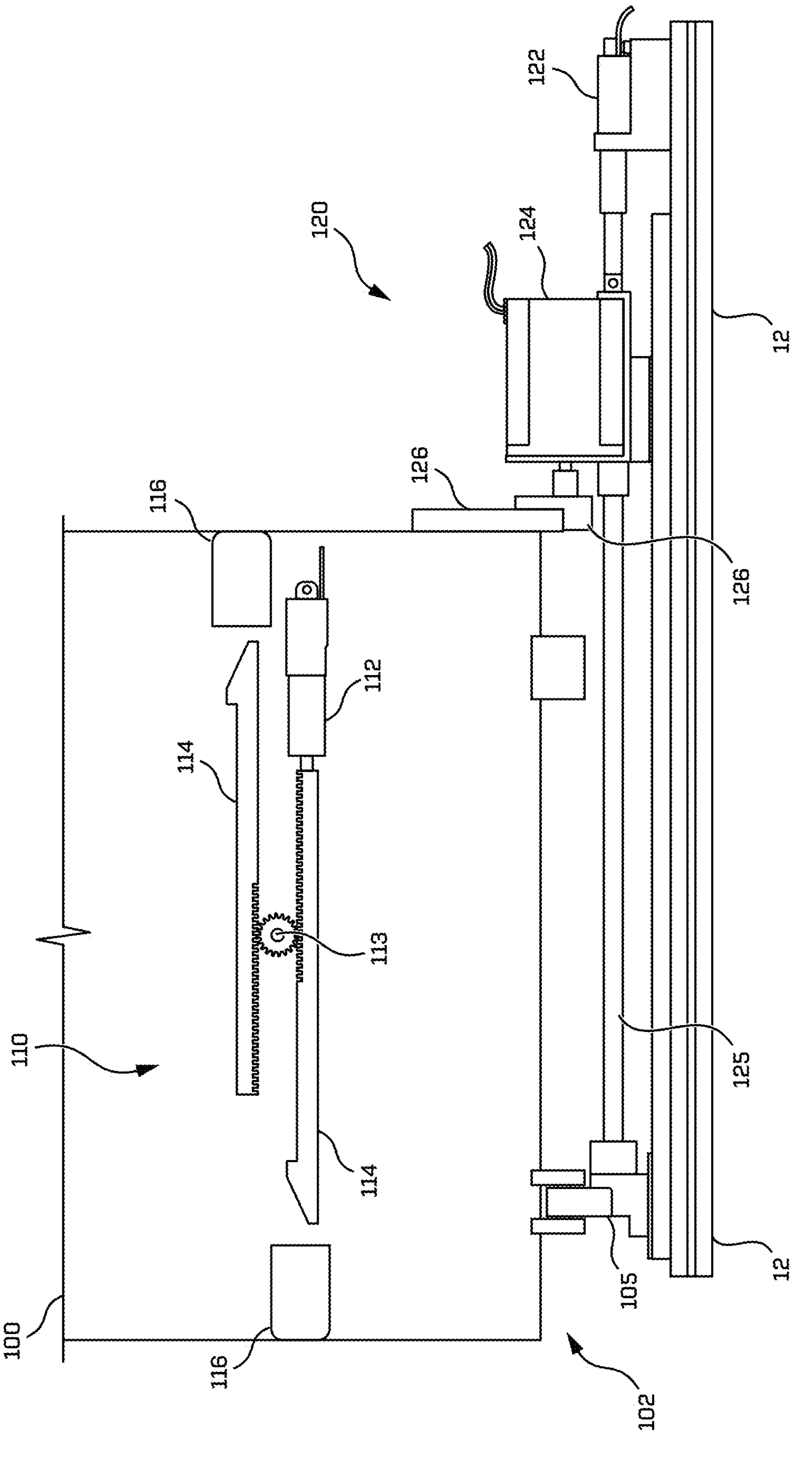

FIGS. 3B and 3D are zoomed-in views of the ramp element 100 depicted in FIGS. 3A and 3C.

The first actuator assembly 110 may be arranged on an inside of the door 20, e.g., the side facing the interior of the vehicle 10 when the door 20 is closed. In the present example, two pairs of pins 114, 114' are provided to couple and decouple the ramp element 100: a first pair of pins 114 arranged at a proximal portion of the door 20 and a second pair of pins 114' arranged at a distal portion of the door 20. The pins 114, 114' may be configured to engage the receiving structures 116, 116' of the ramp element 100. The receiving structure 116, 116' may be engaged by pushing the pins 114, 114' along a horizontal direction, orthogonal to a length direction of the ramp element 100. Correspondingly, the receiving structure 116, 116' may be released by retracting the pins 114, 114' along the same direction. In some examples, the pins 114, 114' may be formed of a plastic material while the receiving structures 116, 116' are formed of a metal so as to reduce any noise that may be generated vibrations and the two different materials engaging each other.

In some examples, the coupling mechanism may comprise latches, hooks, or other fastening means, forming a releasable engagement between the ramp element 100 and the door 20.

The pins 114, 114' may be operated by an actuator, such as a linear actuator 112, pushing the pins 114, 114' into the receiving structure to form a coupling and retracting the bolts to decouple the ramp element 100 from the door. The linear actuator 112 may, for example, be a solenoid actuator attached to the door 20 and pushing and pulling the pins 114, 114' to couple and decouple the ramp element 100 to the vehicle 10. To facilitate insertion into the receiving structures 116, 116', the pins 114, 114' may be provided with a tapered or wedge-shaped tip guiding the pins 114, 114' into the correct position and compensating for possible misalignments between the pins 114, 114' and the receiving structures 116, 116'. The receiving structures 116, 116' may comprise a mating portion having a similar shape as the tip of the pins 114, 114'. Other examples of linear actuators include hydraulic, pneumatic, or piezoelectric actuators.

In the present example, each pair of pins 114, 114' are configured to be actuated by means of a rack and pinion mechanism. The pins 114, 114' are designed to function as the rack, moving synchronously but in opposite directions, driven by the pinion 113, 113' located between them. This configuration allows precise and coordinated movement of the pins 114, 114' using a single actuator 112. As shown in FIG. 3B, each pin 114 is provided with teeth, forming a linear gear that engages a circular gear formed by the pinion 113. When the linear actuator 112 pushes or pulls a first one of the pins 114, the linear motion is transmitted to the other one of the pair of pins 114 by the pinion 113. This arrangement allows the pins 114 to move in opposite direction to engage disengage the corresponding attachment points 116. When the ramp needs to be deployed, the pins 114 may be actuated to release the ramp element 100 from its stowed position. Conversely, when the ramp needs to be stowed, the pins 114 may be actuated to secure the ramp element 100 in place. Of course, though illustrated as a rack and pinion, the disclosure is not meant to be so limiting and any other actuator capable of causing linear motion to engage and disengage pins 114 and 114' is contemplated.

The linear actuator 112 of the first actuator assembly 110 shown in FIGS. 3A and 3B may actuate both pin pairs 114, 114', i.e., the pins 114 arranged to engage the proximal portion 102 as well as the pins 114' arranged to engage the distal portion 104 of the ramp element 100. This may be achieved by a coupling mechanism, such as a continuous belt 115, connecting the lower and upper pairs of pins 114, 114'. The belt 115 may be routed around the central pinion 113, 113' of the respective rack and pinion mechanisms actuating the lower and upper pairs of pins 114, 114'. As the linear actuator 112 drives one of the pins 114, the rack and pinion mechanisms and the belt 115 may ensure that all four pins 114, 114' move in a coordinated way, allowing a synchronous movement and a precise coupling and decupling of the ramp element 100. FIGS. 3A and 3B show the first actuator assembly 110 when actuated to secure the ramp element 100 in place, whereas FIGS. 3C and 3D show the first actuator assembly 110 in a decoupled state, in which the ramp element 110 is ready to be deployed. Of course, in alternative or additional examples, multiple actuators may be used for each of one or more sets of pins.

The first actuator assembly 110 may be arranged on the door 20. In other examples, the first actuator assembly 110, or parts of it, can be arranged on the ramp element 100 instead. The pins 114, 114' and the linear actuator 112 may, for example, be arranged on the backside of the ramp element 100, e.g., the side facing the ground in the deployed position, and engage receiving structures 116, 116' arranged on the door 20.

The second actuator assembly 120 may be arranged at a second portion of 12 of the vehicle 10, such as at a portion of the vehicle floor, to releasably couple the ramp element 100 to the pivot axis A. In FIGS. 3A and 3B, the second actuator assembly 120 is shown in a decoupled state, allowing the ramp element 100 to be attached to the door 20 and remain attached as the door 20 opens and closes. In FIGS. 3C and 3D, the second actuator assembly 120 has been actuated to couple the proximal portion 102 of the ramp element 100 to the second portion 12 of the vehicle 10. In this state, the second actuator assembly 120 forms a rotatable coupling between the ramp element 100 and the vehicle 10, allowing the ramp element 100 to be tilted towards the ground to form a pathway for a wheelchair entering or exiting the vehicle 10.

The second actuator assembly 120 shown in FIGS. 3C and 3D comprises a linear actuator 122 that causes a coupling arm 125 to engage and disengage a hinge element 105 of the proximal portion 102 of the ramp element 100. The linear actuator 122 may, similar to the linear actuator 112 of the first actuator assembly 110, be an electric actuator powered by means of an electric cable. The power supply, and hence the operation of the actuator 122, may be controlled by a drive component controller as indicated in FIG. 6. When the ramp is needed, the linear actuator 122 may be actuated to cause the coupling arm 125 to form a rotatable joint with the hinge element 105, allowing the ramp element 100 to be moved from the stowed position to the deployed position.

The pivoting or rotation of the ramp element 100 may be achieved by means of a rotary actuator 124, comprising a pivot arm 126 that engages a pivot element 106 of the proximal portion 102 of the ramp element 100. The rotary actuator 124 may be an electric actuator powered by an electric cable and controlled by a drive component controller. The pivot arm 126 can be rotated by the rotary actuator 124 to transmit a force from the actuator 124 to the ramp element 100, causing the ramp element 100 to pivot. The rotatory actuator 124 and the pivot arm 126 may be moved back and forth by the linear actuator 122 to engage and disengage the pivot element 106. When the ramp element 100 is in the stowed position, the pivot arm 126 is decoupled from the pivot element 106. When the ramp element 100 is needed, linear actuator 122 pushes the rotary actuator 124 and the pivot arm 126 towards the ramp element 100, allowing the pivot arm 126 to engage the pivot element 106 and rotate the ramp element 100 around the rotation axis A, which extends through the rotatable joint formed by the coupling arm 125 and the hinge element 105.

In some examples, the rotary actuator 124 comprises a stepper motor. The stepper motor may be configured to bear the torque generated by the weight of the ramp element 100. Alternatively, or additionally, a gear mechanism may be provided to reduce the torque exerted on the rotary actuator 124.

The rotary actuator may, for example, be a mechanical, electrical, hydraulic, or pneumatic actuator.

Figure 4A:
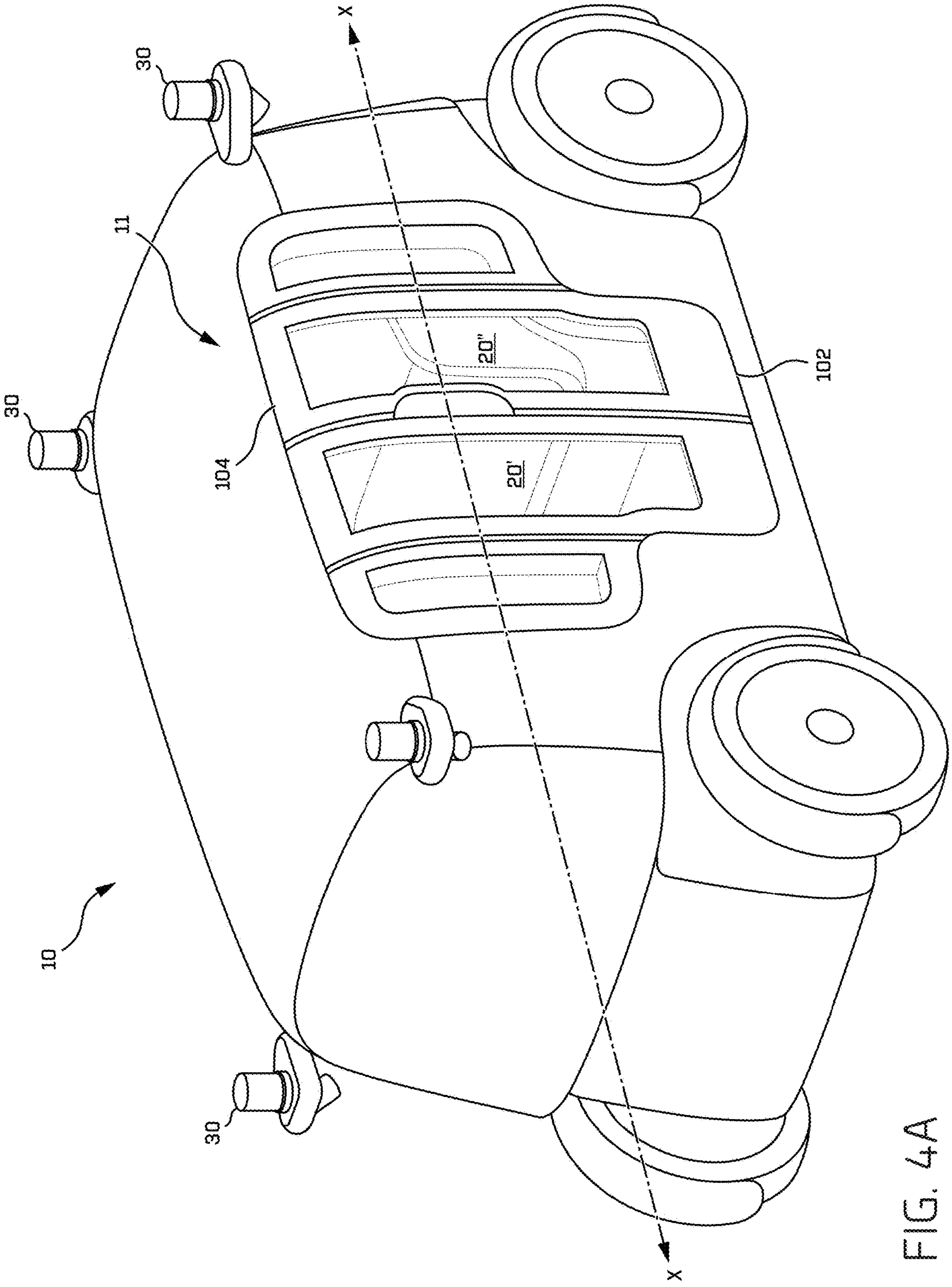
FIG. 4A shows a vehicle with a ramp element which is formed by a door of the vehicle and arranged in the stowed position.
Figure 4B:
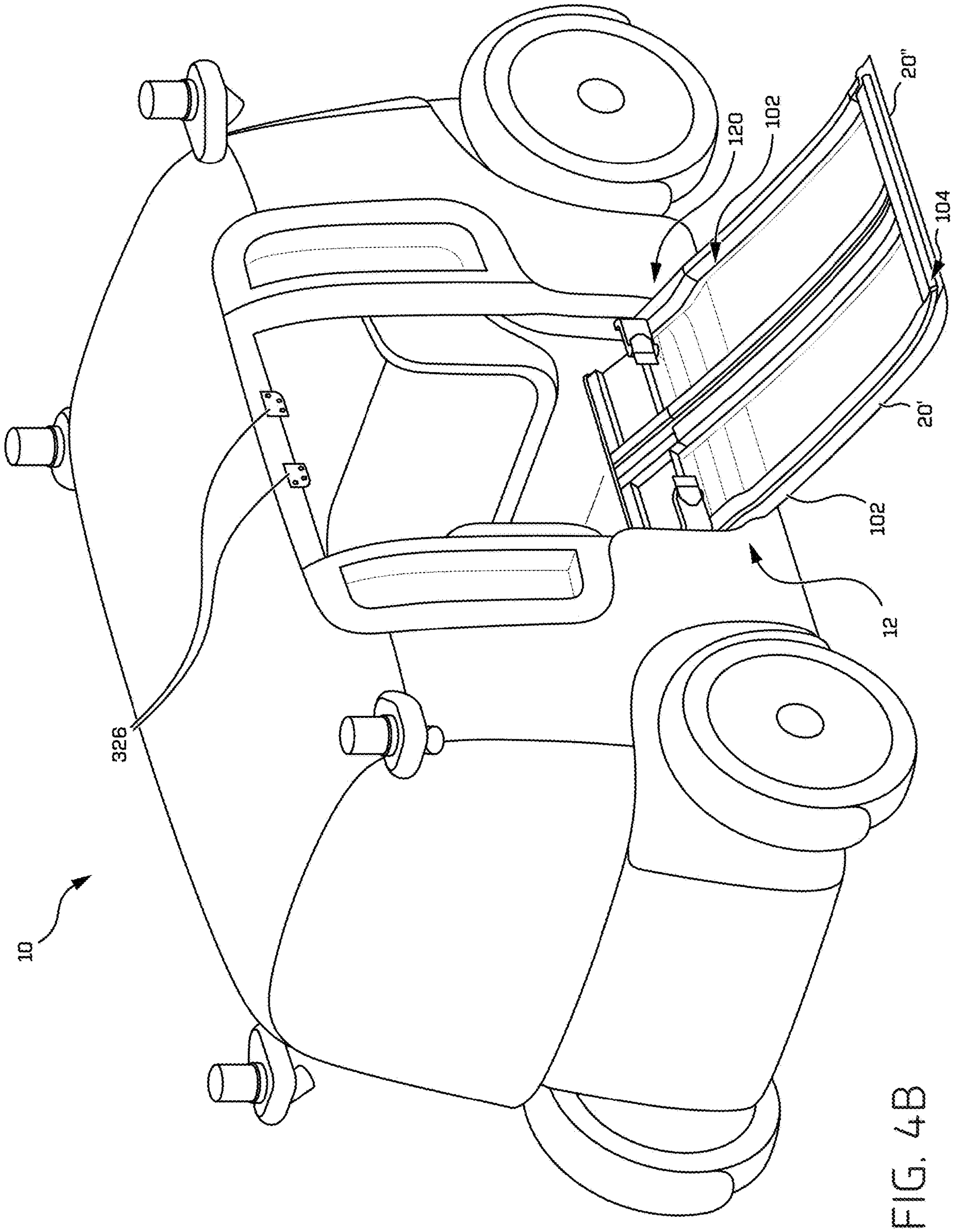
FIG. 4B shows the vehicle with the door arranged in the deployed position, forming part of a ramp.
Figure 4C:
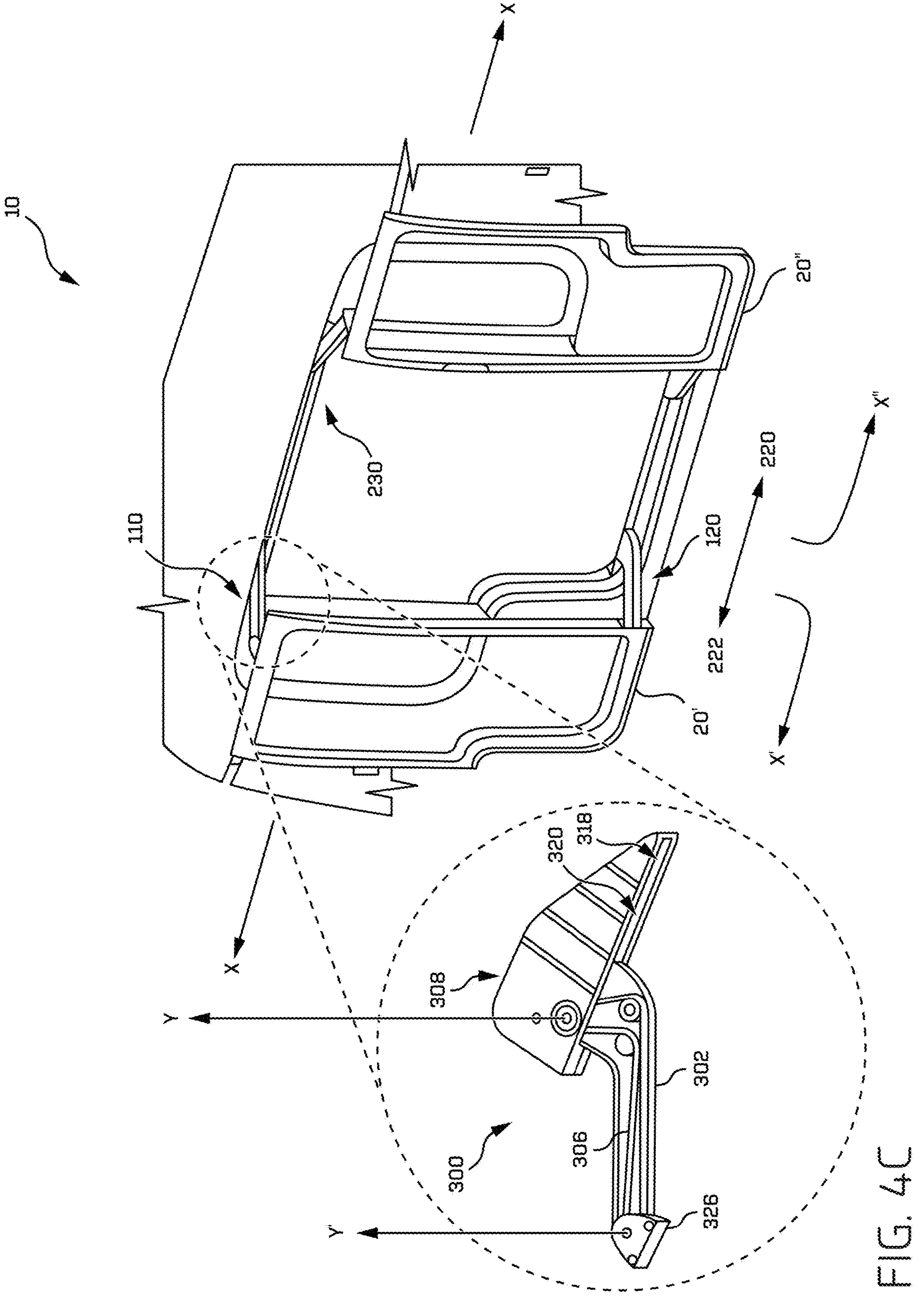
FIG. 4C shows a door actuator mechanism, forming part of an actuator assembly for operating the ramp element.

In some examples, the ramp element 100 may be formed by the vehicle door 20 itself. An example configuration is depicted in FIGS. 4A, 4B, and 4C, showing a vehicle 10 where the ramp is formed by a pair of vehicle doors 20', 20'', allowing for dual operational modes of the doors 20', 20''. FIG. 4A shows the doors 20', 20'' in a closed position, corresponding to the ramp being stowed away, while FIG. 4B shows the doors 20', 20'' when tilted towards the ground, corresponding to the ramp being arranged in a deployed position. This configuration enables the doors 20', 20'' to function both as conventional doors opening and closing the interior 230 of the vehicle 10 and as ramp elements 100, enhancing accessibility without requiring separate ramp elements. FIG. 4C shows a detailed example of a door actuator mechanism 300, forming part of the actuator assemblies 110, 120.

The door 20 may comprise a translucent or transparent material allowing light to pass into the interior of the vehicle 10. In some examples, the door 20 is formed fully or partially of polymeric sheets, such as transparent polymeric sheets, or hardened glass, to provide a see-through window functionality.

In the standard door operation mode, the first actuator assembly 110 and the second actuator assembly 120 may keep the doors 20', 20'' substantially vertical and aligned with each other and assist in controllably moving the respective door 20', 20'' between the open and closed positions. The actuator assemblies 110, 120 may be configured such that any lateral movement of the door 20', 20'' (e.g., movement of the door 20 in the forward direction 220 or rearward direction 222 of the vehicle 10) may be maintained along a path, at least portion of which is substantially parallel to a longitudinal axis X of the vehicle 10. Such an example path corresponding to a first door 20' of the pair of doors is illustrated by the arrow X' in FIG. 4C, and an example path corresponding to a second door 20'' of the pair of doors is illustrated by the example arrow X'' shown in FIG. 4C. It is understood that in any of the examples described herein, when transitioning the vehicle doors 20', 20'' between the open and closed positions, the actuator assemblies 110, 120 may be configured to move the vehicle doors 20', 20'' along a travel path X', X'' such that a face and/or other outer surface of the vehicle door 20 remains substantially parallel to the longitudinal axis X of the vehicle 10. It is understood that such an example path X', X'' may extend from the closed position of the vehicle door 20 to the open position of the vehicle door 20, and vice versa.

For example, in transitioning the doors 20', 20'' between the open position and the closed position, the actuator assemblies 110, 120 may assist in moving the doors 20', 20'' along a path substantially parallel to the longitudinal axis X when moving the doors 20', 20'' in the forward direction 220 or in the rearward direction 222. Transitioning the doors 20', 20'' between the open position and the closed position may also include movement of the doors 20', 20'' in a direction substantially perpendicular to the longitudinal axis X (e.g., inward toward the interior space 230 when closing the doors 20', 20'' and outward away from the interior space 230 when initially opening the doors 20', 20'') for a portion of a door travel path X', X''.

The actuator assemblies 110, 120 may include one or more components configured to facilitate movement of the doors 20', 20''. For example, the actuator assemblies 110, 120 may include a door actuator mechanism 300 comprising a base plate 302 that is rotatable, pivotable, and/or otherwise movable about a rotational axis Y relative to the body of the vehicle 10. In some examples, the rotational axis Y may be substantially perpendicular to the longitudinal axis X of the vehicle 10. The base plate 302 may have any shape, size, and/or other configuration in order to assist in moving the respective door 20', 20". For example, the base plate 302 may be substantially L-shaped in order to increase the range of travel of the door 20', 20" as the door 20', 20" is transitioned between the open position and the closed position.

The door actuator mechanism 300 may also include one or more linkages 306 configured to transmit and/or transfer torque, movement, and/or rotational forces for rotating the base plate 302 around the rotational axis Y to operate the door 20', 20". The door actuator mechanism 300 may further include a housing 308 comprising a substantially rigid structure by which the door actuator mechanism 300 can be mounted to a first portion 12 of the body of the vehicle 10, such as a door frame of the vehicle 10. The housing 308 may comprise an opening 320 to an interior space 318 configured to accommodate the substantially the entire base plate 302 when the base plate 302 is rotated in a first direction. For example, the base plate 302 can be rotated about the rotational axis Y in the first direction such that, in a first position of the base plate 302, at least a portion of the base plate 302 may be disposed substantially within the interior of the housing 308. In such examples, the first position of the base plate 302 may correspond to a closed position of the door 20', 20" to which the door actuator mechanism 300 is connected. Likewise, the base plate 302 may be rotated about the rotational axis Y in a second direction opposite the first direction such that, in a second position of the base plate 302, the portion of the base plate 302 described above may be disposed external to the interior space 318. In such examples, the second position of the base plate 302 may correspond to an open position of the door 20', 20" to which the door actuator mechanism 300 is connected, and FIG. 4C illustrates an example second position of the base plate 302. In this way, at least the portion of the base plate 302 described above may pass through the opening 320 as the base plate 302 transitions between the first position and second position.

The door actuator mechanism 300 may also include one or more brackets 326 configured to connect at least a portion of the door actuator mechanism 300 to a distal portion 104 of a respective door 20', 20" of the vehicle 10. For example, the bracket 326 may be connected to the base plate 302 and configured to rotate around a rotational axis Y' substantially parallel to the rotational axis Y as the base plate 302 transitions between the first position and the second position during opening and closing of the door 20', 20". As a result, the bracket 226 may be configured to assist the door 20', 20" in traveling along the path X', X" described above. In particular, in transitioning the door 20', 20" between the open position and the closed position, the bracket 326 connected to the door 20', 20" may move the door 20', 20" along a path substantially parallel to the longitudinal axis X when moving the door 20', 20' in the forward direction 220 or in the rearward direction 222. To facilitate movement of the doors 20', 20" along the path described above, in some examples the connection between the bracket 326 and the base plate 202 may cause the bracket 326 to rotate about the rotational axis Y' in a direction opposite to the direction of rotation of the base plate 302 as the door 20', 20" transitions between the open position and the closed position.

As shown in FIG. 4C, the vehicle 10 may comprise similar door actuator mechanisms 300 at the distal portion 104 and the proximal portion 102 of the doors 20', 20". Hence, there may be provided four similar door actuator mechanisms 300 for operating the door pair 20', 20" illustrated in the present example. In some examples, the upper door actuator mechanisms 300, coupling the distal portions 104 of the doors 20', 20" to the body of the vehicle 10, may be passive mechanisms guiding the movement of the doors 20', 20" as they transition between the open and the closed states, whereas the lower door actuator mechanisms 300, coupling the proximal portions 102 of the doors 20', 20" to the body of the vehicle 10, may be active mechanisms providing the necessary force for opening and closing the doors 20', 20".

The first actuator mechanism 110 may be configured to attach and release the distal portion 104 of the doors 20', 20" from the bracket 326 to allow the doors 20', 20" to be tilted towards the ground and form a ramp, as indicated in FIG. 4B. This may be achieved by a coupling mechanism which may be configured similarly to the mechanisms discussed above in connection with FIGS. 3A, 3B, 3C, and 3D. Hence, the coupling mechanism, releasably coupling the distal portion 104 of the doors 20', 20" to the respective door actuator mechanisms 300, may comprise one or more pins, latches, or clamps operable to engage and disengage the respective doors 20', 20". The coupling mechanism may, for example, be actuated by means of an electromagnetic or a solenoid actuator moving the pins back and forth to release and attach the doors 20', 20".

The present configuration allows the doors 20', 20" to be operated in dual operational modes, namely a standard door operation mode and in a ramp mode. In the standard door operation mode, the first and second actuator assemblies 110, 120 are operable to open and close the doors 20', 20" while keeping them substantially vertical. This transition between the open and closed positions may involve moving the doors 20', 20" along paths X', X", as discussed above. This movement may be facilitated by part of the actuator assemblies 110, 120 rotating around vertical axes Y, Y' as illustrated in FIG. 4C. In the ramp mode, however, the distal portion 104 of the doors 20', 20" may be detached from the vehicle body, such as from the bracket 326 of the door actuator mechanism 300, which connects the doors 20', 20" to the upper part of the door opening of the vehicle 10. This detachment allows the doors 20', 20" to be tilted toward the ground. The tilting action may be achieved by means of the second actuator assembly 120, which may be operable to rotate the doors 20', 20" around the pivot axis A, similar to the mechanism described for the ramp elements 100 shown in FIGS. 3A, 3B, 3C, and 3D. Thus, the second actuator assembly 120 may function as a dual-function actuator assembly, enabling the doors 20', 20" to operate in a conventional door operation mode by rotting around a substantially vertical axis Y, Y" and slide along the longitudinal axis X of the vehicle 10, and in a ramp formation mode by rotating around a substantially horizontal axis, the pivot axis A, to deploy the ramp.

This dual function may be facilitated by two separate hinge elements or joints: a first hinge element that permits movement along the paths X', X" in the door operation mode, and a second hinge element that allows the doors 20', 20" to tilt downward, forming a ramp. The second actuator assembly 120 is configured to switch between these hinge elements, such that the first hinge element is disengaged when the second hinge element is engages, and vice versa.

In another example, the second actuator assembly 120 may comprise a double-axis hinge, configured to rotate around two different sets of axes: the vertical axes Y, Y' for door operation, and the horizontal axis A for ramp operation. The second actuator assembly 120 may be operable to switch the operational mode of the double-axis hinge between the vertical and horizontal axes.

In some examples, the second actuator assembly 120 comprises a rotary actuator 124, such as a stepper motor. The stepper motor may be configured to bear the torque generated by the weight of the door 20 as it is tilted towards the ground. Alternatively, or additionally, a gear mechanism may be provided to reduce the torque exerted on the rotary actuator 124.

The operation of the ramp typically involves a series of actions which may be automated to facilitate wheelchair access in a smooth and seamless way. The operation may begin with detecting a need for the ramp. This can be initiated by the user via a user interface at the vehicle, in a mobile application, or in a transportation system sending instructions to the vehicle 10. The user may, for example, indicate their need for a ramp when ordering the ride through a mobile application, or by a user interface at the vehicle.

Once a ramp request is received and/or determined, the first actuator assembly 110 and the second actuator assembly 120 may be engaged to deploy the ramp element. The operation of the actuator assemblies 110, 120 may vary depending on the configuration of the ramp. In case the ramp is formed by one or more separate ramp element(s) 100, as shown in FIGS. 1A-D, FIG. 2, and FIGS. 3A-D, the first actuator assembly 110 may be activated to decouple the ramp elements 100 from the doors 20', 20". This may involve retracting the coupling pins 114, 114' that secure the ramp elements 100 to the doors 20. With the ramp elements 100 decoupled, the doors 20 are then moved to the open state (as shown in FIG. 1B). The first actuator assembly 110 may guide the doors 20 long predetermined paths, ensuring they are fully open to allow the deployment of the ramp elements 100.

The second actuator assembly 120 may be engaged to transition the ramp element 120 from their stowed position to the deployed position. This process may include coupling the proximal portion 102 of the ramp elements 100 to the vehicle body and rotating the ramp elements 100 around the pivot axis A. This action lowers the distal portion 102 of the ramp elements 100 to the ground, forming an inclined surface suitable for wheelchair or other types of mobility aids.

In case the ramp is formed by one of more doors 20', 20", as shown in FIGS. 4A-C, the first actuator assembly 110 may be activated to decouple the ramp elements 100 from the vehicle body, such as from the bracket 326 of the door actuator mechanism 300, which connects the doors 20', 20" to the upper part of the door opening of the vehicle 10. This may involve retracting coupling pins or inactivate an electromagnet securing the doors 20', 20" to the door actuator mechanism 300.

The second actuator assembly 120 may be engaged to transition the ramp element 120 from their stowed position to the deployed position. This process may include operating a rotational actuator, such as a motor, to rotate the doors 20', 20" around the pivot axis A. This action lowers the distal portion 102 of the doors 20', 20" toward the ground, forming an inclined surface suitable for wheelchair or stroller access.

To ensure safety and stability during this process, a check may be performed to verify that the ramp is securely deployed and safe for use. This may be performed in a similar way regardless of whether the ramp is formed by one or more separate ramp elements 100 that can be coupled to the doors 20, or if the ramp is formed by the doors 20', 20" themselves. Various checks and monitoring activities can be combined with both configurations. For example, the rotational or angular position of the ramp elements 100 may be monitored, using sensors that provide real-time data on the ramp element's 100 position to ensure that it reaches the correct deployment angle. This angular position may be compared to predefined values to confirm full deployment. In some examples, torque sensors may be employed to measure the force applied by the second actuator assembly 120. Variations in the torque may be analyzed to determine that the distal portion 104 of the ramp element 100 has made contact with the ground. In examples where the second actuator assembly 120 is applying a force to push the ramp element 100 toward the ground, an increasing torque may indicate the ramp element 100 has reached the ground and cannot move any further. In examples where the ramp element 100 is pulled towards the ground by gravity and the second actuator assembly 120 is applying a force counteracting the gravity to control the speed with which the ramp element 100 rotates, a decreasing torque may indicate that the ramp element 100 has reached the ground and therefore no longer moves. Thus, by analyzing the torque data and compare them with predetermined data, or reference values, it can be verified that the ramp is securely positioned and capable of supporting a wheelchair during ingress or egress. In some examples, torque data may be combined with (rotational) position data to determine when the ramp element 100 is fully deployed.

Further example methods for detecting that the ramp element 100 is fully deployed include limit switches, which may be activated when the ramp reaches its fully deployed position, sending a signal to a control system. Proximity sensors can detect the presence of the ramp element 100 at a specific position without physical contact, while load sensors may measure the weight or pressure exerted by the ramp element 100 to confirm that it is correctly positioned on the ground. Linear potentiometers can provide linear position measurements, and optical sensors, such as photoelectric sensors, may detect the ramp element's 100 position through reflective markers or interrupt beams.

A proximity sensor may also be employed to determine the position of the ground relative to the vehicle 10, allowing for, for example, a raised sidewalk surface to be accounted for when deploying the ramp element 100.

Further checks may be performed to determine that it is safe to use deploy the ramp element 100, and more specifically that a movement path of the ramp element 100 is free of obstacles. One option would be image analysis, which involves using image sensors to capture real-time visual data of the ramp element 100 and its immediate surroundings. This data may then be processed using image recognition algorithms to detect any obstacles preventing the ramp from being moved. If obstacles are detected, an alert may be sent to the control system to either notify the user or prevent the deployment until the path is clear. In a further example, the vehicle may be caused to move to another location before the ramp is deployed. In some examples, the user may be prompted to check the conditions of the environment and confirm that the movement path of the ramp element 100 is free of obstacles.

Examples of such image sensors, which may be used to determine that the movement path of the ramp element 100 is free of obstacles, include one or more RADAR sensors, LIDAR sensors, and/or other components mounted on the vehicle 10. The sensors 30 may be mounted to a portion of the vehicle 10 that provides a line-of-sight view of a portion of the area around the vehicle 10. As shown in FIGS. 1A-1C, each example sensor 30 can be mounted to a portion of the roof of the vehicle 10, such as two at the front end of the vehicle 10 and two at the back end of the vehicle 10. This can enable the vehicle 10 to detect objects regardless of which direction the vehicle 10 is traveling. This can also enable the vehicle 10 to detect objects and obstacles located at the sides of the vehicle 10, such as in front of the doors 20 and along the movement path of the ramp element 100 as it is tilted toward the ground.

The image sensors 30 may be any known types of digital image sensors, digital or analog cameras, and/or digital or analog video cameras. The image sensors 30 may be high dynamic range (HDR) cameras, for example, to provide improved accuracy of the images. In some examples, the image sensors 30 may include one or more of light-sensitive cameras, range sensors, tomography devices, RADAR, and/or ultra-sonic cameras. Other suitable types of image sensors are contemplated. The image sensors 30 may be selected to provide two-dimensional (2D) image data, two and a half-dimensional (2.5d, or depth maps), and/or three-dimensional (3D) image data, image sequences, gray image data, and/or color image data. In some examples, the image sensors 30 may be selected to provide depth data, absorption data, and/or reflection data.

The image sensor may also be used to detect if any obstacles appear during the movement of the ramp element 100, i.e., after the second actuator assembly 120 has started to move tilt the ramp 100. If such an obstacle is detected, a signal may be sent to the second actuator assembly 120 to stop the rotation of the ramp element 100.

In some examples, a visual or audible warning may be generated to alert people that the ramp element 100 is in motion. These warnings may include lights, such as LED indicators, that may be activated automatically when the ramp element 100 begins to move. Digital display screens may also be provided, displaying messages such as 'Ramp Deploying' or 'Ramp Retracting' to provide textual warnings. The lights or displays may be arranged on the exterior of the vehicle, near the ramp element 100. In further examples, beeping sounds or voice announcements may be employed to alert nearby individuals. These announcements may provide instructions or warnings, such as 'Caution, Ramp is Deploying' or 'Please Stand Clear: Ramp in Motion'.

In some examples, a light pattern may be produced on the ground, indicating the space the ramp element 100 will cover in its deployed position. The light pattern may thus serve to alert the surrounding of the space which needs to be cleared when operating the ramp element 100. The pattern may, for example, be generated by means of laser.

The visual and/or audible warnings may be synchronized with the actuator assemblies 110, 120 controlling the ramp element 100. When the actuator assemblies 110, 120 engage to move the ramp element 100, signals may be sent simultaneously to activate the visual and/or audible warnings. Once the ramp element 100 is fully deployed or stowed, the warnings may be automatically deactivated.

In some examples, physical barriers can be implemented to block access to the ramp element 100 until it is fully deployed and ready for use. The physical barrier may be designed to physically prevent individuals from stepping onto the ramp element 100 while it is in motion. When the ramp element 100 begins to move, a barrier element, such as a rod or bar, may be automatically deployed. This barrier may be positioned at the proximal portion 102 and/or the distal portion 104 of the ramp element 100 or the doors 20', 20". The barrier may be configured to move in conjunction with the actuator assemblies 110, 120, ensuring it is coordinated with the ramp element's 100 movement. The barrier can be operated by an actuator mechanism similar to the ones used for the ramp. When the ramp deployment is initiated, the actuator may extend the barrier to block access. Once the ramp is fully deployed, the barrier may be retracted, allowing users to access the ramp.

The deployment of the ramp element 100 may be based at least in part on a ramp deployment location, which may be provided together with the ramp request or separately, for example from a user interface of the vehicle 10 or a transportation system storing information associated with an identity of the user. The ramp deployment location may indicate a pick-up location or a drop-off location in which the user needs the ramp for ingress (pick-up location) or egress (drop-off location). The ramp request and/or the ramp deployment location may be included in a transportation request submitted by the user. When ordering a transportation, the user may provide the transportation request to a transportation system, which matches the required destinations (i.e., pick-up and drop-off location) with a vehicle 10 and associates the destinations with the ramp request. In some examples, the transportation system may generate the ramp request based on passenger data provided with the transportation request. In different words, the need for a ramp may be stored as a user preference associated with the particular user. When the user places a transportation request, i.e., orders a transportation from a pick-up location to a drop-off location, the transportation system may associate these locations with a ramp request. By associating the ramp request with the pick-up and drop-off locations (i.e., ramp deployment locations), the vehicle 10 is allowed to deploy the ramp at the requested locations. During operation, the current location of the vehicle 10 may be compared with the ramp deployment location. When the current location of the vehicle matches the ramp deployment location, the first and second actuator assemblies 110, 120 may be caused to transition the ramp element 100 from the stowed position to the deployed position.

Figure 5A:
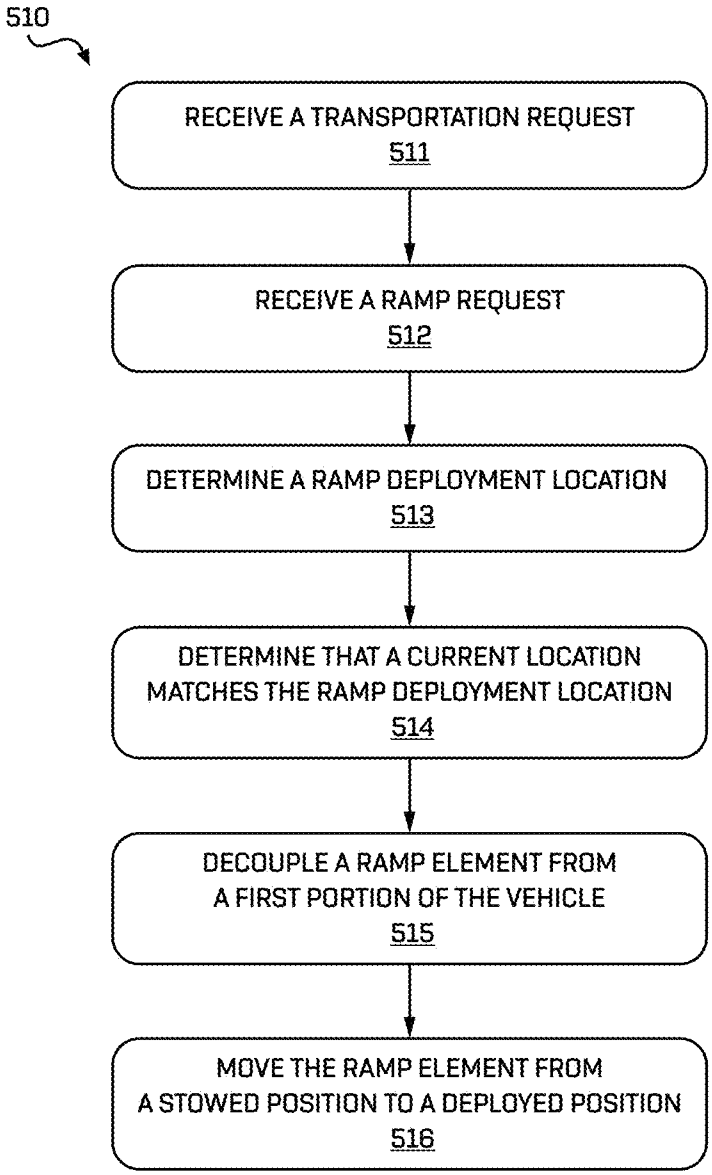
FIG. 5A shows a flow chart of a method for deploying a ramp element, including determining that a current location of the vehicle matches a ramp deployment location.

FIG. 5A shows a flow chart of an example method 510 for deploying a ramp as discussed herein. The method comprises receiving 511 a transportation request, which may include passenger data and destination data, such as pick-up location data and drop-off location data. The transportation request may correspond to a request for a passenger ride from a ride-hauling or ride-sharing service and may be received from a user device, via one or more user interfaces. The passenger data may include the numbers of passengers to be transported, an identity associated with one or more of the passengers, and passenger types/characteristics (e.g., if the passenger is seated in a wheelchair).

The method 510 further comprises receiving and/or determining a ramp request 512, indicating that the ramp is needed. The ramp request may be received together with the transportation request, for example from the user device. In other words, the passenger may indicate that they will need the ramp when requesting the ride. In other examples, the ramp request may be received separately, from a user interface at the vehicle (such as a button at the vehicle doors) or from a transportation system indicating user preferences associated with the passenger. For example, the transportation request may comprise passenger data indicating a preference for the ramp. When receiving the transportation request, the transportation system may generate the ramp request based on the passenger data in the transportation request. When delivering multiple passengers or goods, the system may determine a particular destination is associated with a requirement for a ramp (e.g., based on the user profile, visual detection, etc.) and, in those cases, the ramp signal may be determined or generated.

The method 510 may further comprise determining 513 a ramp deployment location, indicating the location where the ramp is needed. The ramp deployment location may, for example, be determined based on the transportation request and/or the ramp request, which may include destination data indicating a pick-up location and/or a drop-off location for ingress/egress. The passenger may, for example, indicate the location where the ramp is needed in connection with ordering the ride or later, via a user interface of the vehicle or a user interface of the user device. In an example, the ramp deployment location is determined to correspond to the pick-up location, where the passenger enters the vehicle 10, and the drop-off location, where the passenger exists the vehicle 10. In some examples, when it is determined that the location is not suitable for deploying the ramp (e.g., based on space constraints, etc.), the system may select or determine the next closest location for deploying the ramp and provide a signal to the associated user of that change and/or the reason for the change.

Furthermore, the method 510 may comprise determining 514 that a current location of the vehicle 10 matches the ramp deployment location. When the vehicle 10 arrives at a destination location, such as the pick-up location or the drop-off location requested by the passenger, the transportation system may verify that the current location matches the ramp deployment location. Thereafter, the ramp element 100 may be deployed. This may include operating 515 the first actuator assembly 110 to decouple the ramp element 100 from a first portion of the vehicle 10 and operating 516 the second actuator assembly 120 to tilt the ramp element 100 from the stowed position to the deployed position, in which the distal portion of the ramp element 100 rests on the ground to allow ingress and egress of a wheelchair.

Figure 5B:
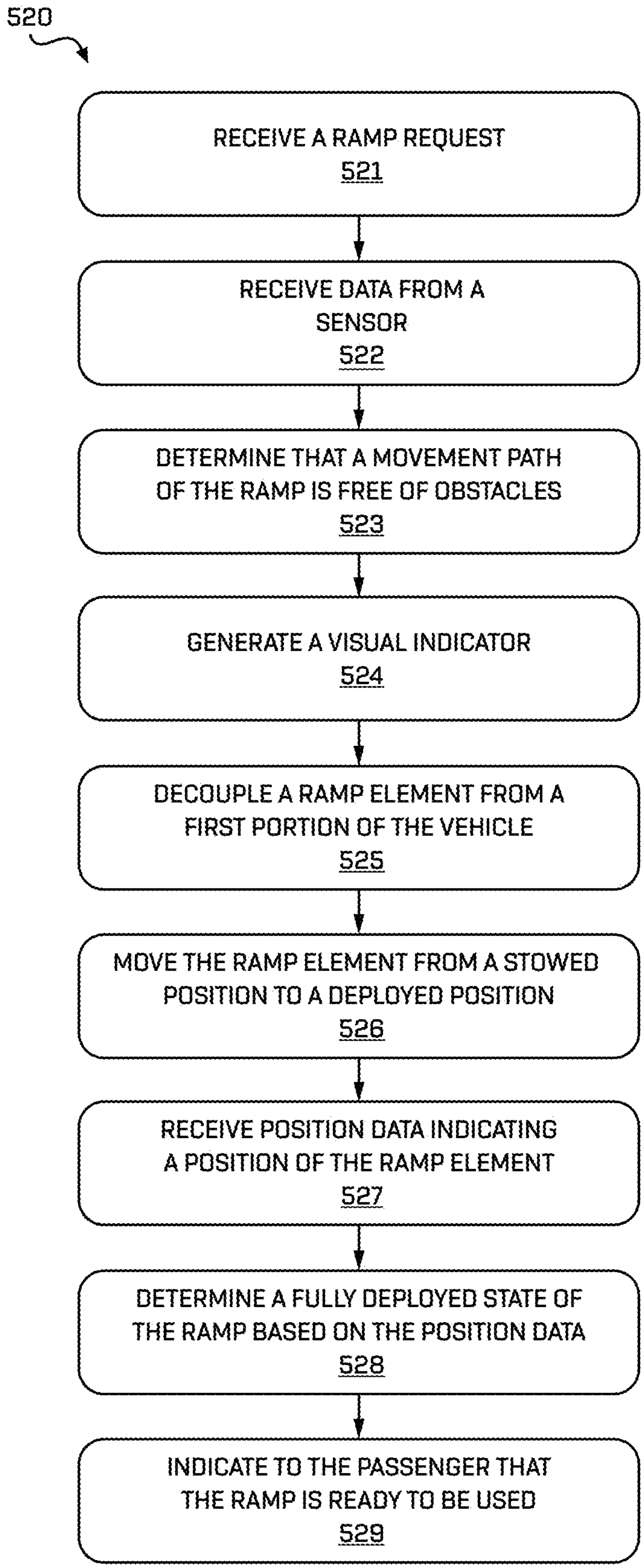
FIG. 5B shows a flow chart of a method for deploying a ramp element, including determining that a movement path of the ramp element is free of obstacles.

FIG. 5B shows a flow chart of another example method 520 for deploying a ramp as discussed herein. The method comprises receiving 521 a ramp request, for example from a user device or a user interface of the vehicle 10, indicating that the ramp will be needed to allow a passenger to enter or exit the vehicle 10. The method 520 further comprises retrieving 522 image data from an image sensor, which may be arranged to monitor an environment of the vehicle 10. The image data may be analyzed to determine a condition of the environment of the vehicle 10. This may include verifying that a movement path of the ramp element is free of obstacles and that it hence is safe to deploy the ramp. Optionally, a visual or audible indicator, or alert signal, may be generated 523 to notify people that the ramp is being deployed.

The ramp element 100 may be deployed by operating 515 the first actuator assembly 110 to decouple the ramp element 100 from a first portion of the vehicle 10 and operating 516 the second actuator assembly 120 to tilt the ramp element 100 from the stowed position to the deployed position, in which the distal portion of the ramp element 100 rests on the ground to allow ingress and egress of a wheelchair. As discussed above, the ramp may be formed by a separate ramp element 100 releasably attached to the vehicle door, or by the door itself. In the latter case, the ramp may be deployed by decoupling a distal portion 104 of the door 20', 20" from the vehicle body and tilting the door around a pivot axis at the proximal portion 102 of the door to arrange it in the deployed position.

The method 520 may further comprise receiving 527, from a sensor, position data indicating a relative position between the ramp element 100 and the ground. The position data may, for example, be retrieved from a proximity sensor indicating a distance between the distal portion of the ramp element and the ground, or from a rotation sensor indicating an angular position of the ramp element 100 relative to the pivot axis A. By analyzing the position data, it may be determined 528 that the ramp element 100 is fully deployed and ready to be used. In some examples, the method 520 comprises indicating 529 to the passenger that the ramp is in its fully deployed position and hence ready to be used.

FIG. 6 illustrates a block diagram of an example system 600 that implements the techniques discussed herein. FIG. 6 may represent the system of FIGS. 1A-C, including the ramp element 100, the first actuator assembly 110, and the second actuator assembly 120. In some instances, the example system 600 may include a vehicle 602, which may represent the vehicle 10 in FIGS. 1A-C, FIG. 2, and FIGS. 4A-C. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being exposed to control the vehicle at any time. However, in other examples, the vehicle 602 may be a fully or partially autonomous vehicle having any other level or classification. Moreover, in some instances, the techniques described herein may be useable by non-autonomous vehicles as well.

The vehicle 602 may include a vehicle computing device(s) 604, sensor(s) 606 (such as the image sensor used to verify that the movement path of the ramp element is free of obstacles, and the proximity sensor used to determine a position of the ramp relative to the ground), emitter(s) 608, network interface(s) 610, and/or drive system(s) 612. The system 600 may additionally or alternatively comprise computing device(s) 632.

In some instances, the sensor(s) 606 may include LIDAR sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 606 may include multiple instances of each of these or other types of sensors. For instance, the radar sensors may include individual radar sensors located at the corners, front, back, sides, and/or top of the vehicle 602. As another example, the cameras may include multiple cameras disposed at various locations about the exterior and/or interior of the vehicle 602. The sensor(s) 606 may provide input to the vehicle computing device(s) 604 and/or to computing device(s) 632.

The vehicle 602 may also include emitter(s) 608 for emitting light and/or sound, as described above. The emitter(s) 608 may include interior audio and visual emitter(s) to communicate with passengers of the vehicle 602. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 608 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 602 may also include network interface(s) 610 that enable communication between the vehicle 602 and one or more other local or remote computing device(s). The network interface(s) 610 may facilitate communication with other local computing device(s) on the vehicle 602 and/or the drive component(s) 612. The network interface(s) 610 may additionally or alternatively allow the vehicle to communicate with other nearby computing device(s) (e.g., other nearby vehicles, traffic signals, etc.). The network interface(s) 610 may additionally or alternatively enable the vehicle 602 to communicate with computing device(s) 632 over a network 638. In some examples, computing device(s) 632 may comprise one or more nodes of a distributed computing system (e.g., a cloud computing architecture).

The vehicle 602 may include one or more drive components 612. In some instances, the vehicle 602 may have a single drive component 612. In some instances, the drive component(s) 612 may include one or more sensors to detect conditions of the drive component(s) 612 and/or the surroundings of the vehicle 602. By way of example and not limitation, the sensor(s) of the drive component(s) 612 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 612. In some cases, the sensor(s) on the drive component(s) 612 may overlap or supplement corresponding systems of the vehicle 602 (e.g., sensor(s) 606).

The drive component(s) 612 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 612 may include a drive component controller which may receive and pre-process data from the sensor(s) and to control operation of the various vehicle systems, such as the actuator assemblies 110, 120 controlling deployment of the ramp element(s) 100. In some instances, the drive component controller may include one or more processors and memory communicatively coupled with the one or more processors. The memory may store one or more components to perform various functionalities of the drive component(s) 612. Furthermore, the drive component(s) 612 may also include one or more communication connection(s) that enable communication by the respective drive component with one or more other local or remote computing device(s).

The vehicle computing device(s) 604 may include processor(s) 614 and memory 616 communicatively coupled with the one or more processors 614. Computing device(s) 632 may also include processor(s) 634, and/or memory 636. The processor(s) 614 and/or 634 may be any suitable processor capable of executing instructions to process data and perform operations as described herein. By way of example and not limitation, the processor(s) 614 and/or 634 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 616 and/or 636 may be examples of non-transitory computer-readable media. The memory 616 and/or 636 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 616 and/or memory 636 may store a perception component 618, localization component 620, planning component 622, map(s) 624, driving log data 626, prediction component 628, and/or system controller(s) 630—zero or more portions of any of which may be hardware, such as GPU(s), CPU(s), and/or other processing units.

The perception component 618 may detect object(s) in in an environment surrounding the vehicle 602 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 618 is referred to as perception data. The perception component 618 may be configured to associate a bounding region (or other indication) with an identified object. The perception component 618 may be configured to associate a confidence score associated with a classification of the identified object with an identified object. In some examples, objects, when rendered via a display, can be colored based on their perceived class. The object classifications determined by the perception component 618 may distinguish between different object types such as, for example, a passenger vehicle, a pedestrian, a bicyclist, motorist, a delivery truck, a semi-truck, traffic signage, and/or the like.

In at least one example, the localization component 620 may include hardware and/or software to receive data from the sensor(s) 606 to determine a position, velocity, and/or orientation of the vehicle 602 (e.g., one or more of an x-, y-, z-position, roll, pitch, or yaw). For example, the localization component 620 may include and/or request/receive map(s) 624 of an environment and can continuously determine a location, velocity, and/or orientation of the autonomous vehicle 602 within the map(s) 624. In some instances, the localization component 620 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 620 may provide data to various components of the vehicle 602 to determine an initial position of an autonomous vehicle for generating a trajectory and/or for generating map data, as discussed herein. In some examples, localization component 620 may provide, to the perception component 618, a location and/or orientation of the vehicle 602 relative to the environment and/or sensor data associated therewith.

The planning component 622 may receive a location and/or orientation of the vehicle 602 from the localization component 620 and/or perception data from the perception component 618 and may determine instructions for controlling operation of the vehicle 602 based at least in part on any of this data. In some examples, the instructions control the deployment and retraction of the ramp element(s) 100. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 630 and/or drive component(s) 612 may parse/cause to be carried out, second instructions for the emitter(s) 608 may be formatted according to a second format associated therewith).

The driving log data 626 may comprise sensor data, perception data, and/or scenario labels collected/determined by the vehicle 602 (e.g., by the perception component 618), as well as any other message generated and or sent by the vehicle 602 during operation including, but not limited to, control messages, error messages, etc. In some examples, the vehicle 602 may transmit the driving log data 626 to the computing device(s) 632.

The prediction component 628 may generate one or more probability maps representing prediction probabilities of possible locations of one or more objects in an environment. For example, the prediction component 628 may generate one or more probability maps for vehicles, pedestrians, animals, and the like within a threshold distance from the vehicle 602. In some examples, the prediction component 628 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 622 may be communicatively coupled to the prediction component 628 to generate predicted trajectories of objects in an environment. For example, the prediction component 628 may generate one or more predicted trajectories for objects within a threshold distance from the vehicle 602. In some examples, the prediction component 628 may measure a trace of an object and generate a trajectory for the object based on observed and predicted behavior. Although prediction component 628 is shown on a vehicle 602 in this example, the prediction component 628 may also be provided elsewhere, such as in a remote computing device. In some examples, a prediction component may be provided at both a vehicle and a remote computing device. These components may be configured to operate according to the same or a similar algorithm.

The memory 616 and/or 636 may additionally or alternatively store a mapping system, a planning system, a ride management system, etc. Although perception component 618 and/or planning component 622 are illustrated as being stored in memory 616, perception component 618 and/or planning component 622 may include processor-executable instructions, machine-learned model(s) (e.g., a neural network), and/or hardware.

As described herein, the localization component 620, the perception component 618, the planning component 622, and/or other components of the system 600 may comprise one or more ML models. For example, the localization component 620, the perception component 618, and/or the planning component 622 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SEC- OND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 620 may additionally or alternatively store one or more system controller(s) 630, which may be configured to control steering, propulsion, braking, safety, emitters, communication, and other systems of the vehicle 602. These system controller(s) 630 may communicate with and/or control corresponding systems of the drive component(s) 612 and/or other components of the vehicle 602.

It should be noted that while FIG. 6 is illustrated as a distributed system, in alternative examples, components of the vehicle 602 may be associated with the computing device(s) 632 and/or components of the computing device(s) 632 may be associated with the vehicle 602. That is, the vehicle 602 may perform one or more of the functions associated with the computing device(s) 632, and vice versa.

Example Clauses

A: A system comprising: a ramp element for supporting a wheeled device entering or exiting a vehicle; a first actuator assembly operable to releasably couple the ramp element to a first portion of the vehicle; a second actuator assembly arranged at a second portion of the vehicle and operable to rotate the ramp element around a first axis arranged at a proximal portion of the ramp element; one or more processors; and one or more non-transitory computer-readable media storing instructions executable by the one or more processors, wherein the instructions, when executed, cause the system to perform operations comprising: receiving a ramp request indicating a request to deploy the ramp element; operating, based at least in part on the ramp request, the first actuator assembly to decouple the ramp element from the first portion of the vehicle; and operating, based at least in part on the ramp request, the second actuator assembly to rotate the ramp element around the first axis to move the ramp element from a stowed position to a deployed position, in which a distal portion of the ramp element rests on the ground.

B. The system of clause A, wherein: the first portion of the vehicle forms part of a door of the vehicle; and operating the second actuator assembly comprises rotatably coupling the proximal portion of the ramp element to the second portion of the vehicle.

C. The system of clause A, wherein: the ramp element is formed by a door of the vehicle; and the second portion forms part of a body of the vehicle.

D. The system of clause C, wherein the second actuator assembly comprises a hinge element configured to: couple the door to the second portion of the vehicle; allow the door to rotate around the first axis for moving the door from the stowed position to the deployed position; and rotate around a second axis for moving the door between an open position and a closed position.

E. The system of any one of clause A-D, wherein the second actuator assembly comprises: a linear actuator operable to rotatably couple the proximal portion of the ramp element to the second portion of the vehicle; and a rotary actuator configured to rotate the ramp element around the first axis.

F. The system of any one of clause A-E, wherein the distal portion is foldable towards the proximal portion of the ramp element to decrease a length of the ramp element in the stowed position.

G. A method comprising: receiving a ramp request indicating a request to deploy a ramp element from a vehicle; and deploying the ramp element based at least in part on the ramp request, wherein the deploying the ramp element comprises: decoupling, by a first actuator assembly, the ramp element from a first portion of the vehicle; and rotating, by a second actuator assembly arranged at a second portion of the vehicle, the ramp element around a first axis to move the ramp element from a stowed position to a deployed position, wherein the first axis is arranged at a proximal portion of the ramp element.

H. The method of clause G, wherein: the first portion of the vehicle forms part of a door of the vehicle, and the method further comprises: causing the door to transition to an open door state by moving substantially parallel with a face of the vehicle; and rotatably coupling, by the second actuator assembly, the proximal portion of the ramp element to the second portion of the vehicle.

I. The method of clause G, wherein the ramp element is formed by a door of the vehicle, and wherein the second portion of the vehicle forms part of a body of the vehicle.

J. The method of clause I, further comprising: switching a hinge element, coupling the door to the second portion of the vehicle, from a first state to a second state, wherein the hinge element in the first state is rotatable around a second axis to move the door between an open position and a closed position, and wherein the hinge element in the second state allows the door to rotate around the first axis.

K. The method of any one of clause G-J, comprising rotatably coupling, by a linear actuator, the proximal portion of the ramp element to the second portion of the vehicle.

L. The method of any one of clause G-K, comprising unfolding a distal portion of the ramp element away from the proximal portion.

M. One or more non-transitory computer-readable media storing instructions executable by one or more processors, wherein the instructions, when executed, cause the one or more processors to perform operations comprising: receiving a ramp request indicating a request to deploy a ramp element from a vehicle; and causing, based at least in part on the ramp request: a first actuator assembly to decouple the ramp element from a first portion of the vehicle; and a second actuator assembly arranged at a second portion of the vehicle to rotate the ramp element around a first axis to move the ramp element from a stowed position to a deployed position, wherein the first axis is arranged at a proximal portion of the ramp element.

N. The one or more non-transitory computer-readable media of clause M, wherein the first portion of the vehicle forms part of a door of the vehicle, and wherein the operations comprise: causing the door to transition to an open door state by moving substantially parallel with a face of the vehicle; and causing the second actuator assembly to rotatably couple the proximal portion of the ramp element to the second portion of the vehicle.

O. The one or more non-transitory computer-readable media of clause M, wherein the ramp element is formed by a door of the vehicle, and wherein the second portion of the vehicle forms part of a body of the vehicle.

P. The one or more non-transitory computer-readable media of clause O, wherein the operations comprise: causing a hinge element, coupling the door to the second portion of the vehicle, to be arranged in a first state in which the hinge element is rotatable around a second axis to move the door between an open position and a closed position, and causing the hinge element to be arranged in a second state in which the hinge element allows the door to rotate around the first axis.

Q. The one or more non-transitory computer-readable media of any one of clause M-P, wherein the operations comprise: causing a linear actuator to rotatably couple the proximal portion of the ramp element to the second portion of the vehicle.

R. The one or more non-transitory computer-readable media of any one of clause M-Q, wherein the operations comprise: causing a distal portion of the ramp element to unfold away from the proximal portion.

S. The one or more non-transitory computer-readable media of any one of clause M-R, wherein the operations comprise: causing the second actuator assembly to rotate the ramp element around the first axis to more the ramp element from the deployed position to the stowed position; and causing the first actuator assembly to couple the ramp element to the first portion of the vehicle.

T. The one or more non-transitory computer-readable media of any one of clause M-S, wherein the operations comprise: receiving a transportation request comprising the ramp request and a ramp deployment location; determining that a current location of the vehicle corresponds to the ramp deployment location; and causing, based at least in part on the current location corresponding to the ramp deployment location, commands to be sent to the second actuator to rotate the ramp element.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

a ramp element for supporting a wheeled device entering or exiting a vehicle;

a first actuator assembly operable to releasably couple the ramp element to a first portion of the vehicle, the first actuator assembly operable to linearly actuate a coupling element in a transverse direction relative to a length of the ramp element;

a second actuator assembly arranged at a second portion of the vehicle and operable to rotate the ramp element around a first axis arranged at a proximal portion of the ramp element;

one or more processors; and one or more non-transitory computer-readable media storing instructions executable by the one or more processors, wherein the instructions, when executed, cause the system to perform operations comprising:

receiving a ramp request indicating a request to deploy the ramp element;

operating, based at least in part on the ramp request, the first actuator assembly to decouple the ramp element from the first portion of the vehicle; and operating, based at least in part on the ramp request, the second actuator assembly to rotate the ramp element around the first axis to move the ramp element from a stowed position to a deployed position, in which a distal portion of the ramp element rests on the ground.

2. The system of claim 1, wherein:

the first portion of the vehicle forms part of a door of the vehicle; and operating the second actuator assembly comprises rotatably coupling the proximal portion of the ramp element to the second portion of the vehicle.

3. The system of claim 1, wherein:

the ramp element is formed by a door of the vehicle; and the second portion forms part of a body of the vehicle.

4. The system of claim 3, wherein the second actuator assembly comprises a hinge element configured to:

couple the door to the second portion of the vehicle;

allow the door to rotate around the first axis for moving the door from the stowed position to the deployed position; and rotate around a second axis for moving the door between an open position and a closed position.

5. The system of claim 1, wherein the second actuator assembly comprises:

a linear actuator operable to rotatably couple the proximal portion of the ramp element to the second portion of the vehicle; and a rotary actuator configured to rotate the ramp element around the first axis.

6. The system of claim 1, wherein the distal portion is foldable towards the proximal portion of the ramp element to decrease a length of the ramp element in the stowed position.

7. A method comprising:

receiving a ramp request indicating a request to deploy a ramp element from a vehicle; and deploying the ramp element based at least in part on the ramp request, wherein the deploying the ramp element comprises:

decoupling, by a first actuator assembly, the ramp element from a first portion of the vehicle, the first actuator assembly operable to linearly actuate a coupling element in a transverse direction relative to a length of the ramp element; and rotating, by a second actuator assembly arranged at a second portion of the vehicle, the ramp element around a first axis to move the ramp element from a stowed position to a deployed position, wherein the first axis is arranged at a proximal portion of the ramp element.

8. The method of claim 7, wherein:

the first portion of the vehicle forms part of a door of the vehicle, and the method further comprises:

causing the door to transition to an open door state by moving substantially parallel with a face of the vehicle; and rotatably coupling, by the second actuator assembly, the proximal portion of the ramp element to the second portion of the vehicle.

9. The method of claim 7, wherein the ramp element is formed by a door of the vehicle, and wherein the second portion of the vehicle forms part of a body of the vehicle.

10. The method of claim 9, further comprising:

switching a hinge element, coupling the door to the second portion of the vehicle, from a first state to a second state, wherein the hinge element in the first state is rotatable around a second axis to move the door between an open position and a closed position, and wherein the hinge element in the second state allows the door to rotate around the first axis.

11. The method of claim 7, comprising rotatably coupling, by a linear actuator, the proximal portion of the ramp element to the second portion of the vehicle.

12. The method of claim 7, comprising unfolding a distal portion of the ramp element away from the proximal portion.

13. One or more non-transitory computer-readable media storing instructions executable by one or more processors, wherein the instructions, when executed, cause the one or more processors to perform operations comprising:

receiving a ramp request indicating a request to deploy a ramp element from a vehicle; and causing, based at least in part on the ramp request:

a first actuator assembly to decouple the ramp element from a first portion of the vehicle, the first actuator assembly operable to linearly actuate a coupling element in a transverse direction relative to a length of the ramp element; and a second actuator assembly arranged at a second portion of the vehicle to rotate the ramp element around a first axis to move the ramp element from a stowed position to a deployed position, wherein the first axis is arranged at a proximal portion of the ramp element.

14. The one or more non-transitory computer-readable media of claim 13, wherein the first portion of the vehicle forms part of a door of the vehicle, and wherein the operations comprise:

causing the door to transition to an open door state by moving substantially parallel with a face of the vehicle; and causing the second actuator assembly to rotatably couple the proximal portion of the ramp element to the second portion of the vehicle.

15. The one or more non-transitory computer-readable media of claim 13, wherein the ramp element is formed by a door of the vehicle, and wherein the second portion of the vehicle forms part of a body of the vehicle.

16. The one or more non-transitory computer-readable media of claim 15, wherein the operations comprise:

causing a hinge element, coupling the door to the second portion of the vehicle, to be arranged in a first state in which the hinge element is rotatable around a second axis to move the door between an open position and a closed position, and causing the hinge element to be arranged in a second state in which the hinge element allows the door to rotate around the first axis.

17. The one or more non-transitory computer-readable media of claim 13, wherein the operations comprise:

causing a linear actuator to rotatably couple the proximal portion of the ramp element to the second portion of the vehicle.

18. The one or more non-transitory computer-readable media of claim 13, wherein the operations comprise:

causing a distal portion of the ramp element to unfold away from the proximal portion.

19. The one or more non-transitory computer-readable media of claim 13, wherein the operations comprise:

causing the second actuator assembly to rotate the ramp element around the first axis to move the ramp element from the deployed position to the stowed position; and causing the first actuator assembly to couple the ramp element to the first portion of the vehicle.

20. The one or more non-transitory computer-readable media of claim 13, wherein the operations comprise:

receiving a transportation request comprising the ramp request and a ramp deployment location;

determining that a current location of the vehicle corresponds to the ramp deployment location; and causing, based at least in part on the current location corresponding to the ramp deployment location, commands to be sent to the second actuator assembly to rotate the ramp element.

* * * * *